(12) United States Patent
Kuwano

(10) Patent No.: US 9,049,693 B2
(45) Date of Patent: Jun. 2, 2015

(54) GATEWAY, COMMUNICATION SYSTEM, METHOD OF CONTROLLING GATEWAY, AND COMPUTER READABLE MEDIUM THEREFOR

(71) Applicant: NEC CORPORATION, Tokyo (JP)

(72) Inventor: Hiroaki Kuwano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 157 days.

(21) Appl. No.: 13/900,148

(22) Filed: May 22, 2013

(65) Prior Publication Data

US 2013/0315160 A1 Nov. 28, 2013

(30) Foreign Application Priority Data

May 23, 2012 (JP) .................. 2012-117401

(51) Int. Cl.
*H04W 76/00* (2009.01)
*H04W 76/02* (2009.01)
*H04W 88/16* (2009.01)

(52) U.S. Cl.
CPC .......... *H04W 76/021* (2013.01); *H04W 76/022* (2013.01); *H04W 88/16* (2013.01)

(58) Field of Classification Search
None
See application file for complete search history.

(56) References Cited

U.S. PATENT DOCUMENTS

2013/0157659 A1* 6/2013 Ikeda et al. ............... 455/435.1

OTHER PUBLICATIONS

3GPP TS 23.401 "Technical Specification Group Services and System Aspects; General Packet Radio Service (GPRS) enhancements for Evolved Universal Terrestrial Radio Access Network (E-UTRAN) access (Release 10)", Mar. 2011, pp. 39-40, V10.3.0, Clause 4.3.16.
3GPP TSG-SA-WG1 Meeting #51, S1-102154, "Remote Local IP access", Aug. 2010, 4 pgs.
S2-100007, 3GPP "Proposed solution of architecture variant 1", ZTE; Jan. 18 to 22, 2010; 6 pages total.
S2-111362 3GPP "3G HNB BBAI support for CS service", ZTE; Apr. 11 to 15, 2011, 10 pages total.
R3-102915 3GPP "LIPA impacts in RAN3", Qualcomm Inc,; Oct. 11 to 15, 2010; 5 pages total.
S2-102294 3GPP "Details in LIPA/SIPTO Solution 6", NEC; May 10 to 14, 2010, 42 pages total.
S2-103375 3GPP "Coexistence of the corporate APN and LIPA", Qualcomm Inc,; Aug. 30 to Sep. 3, 2010; 6 pages total.
Written Opinion dated Jul. 16, 2013, issued by the International Searching Authority in corresponding International application No. PCT/JP2013/003263.
International Search Report dated Jul. 16, 2013, issued by the International Searching Authority in corresponding International application No. PCT/JP2013/003263.

* cited by examiner

*Primary Examiner* — John Blanton
(74) *Attorney, Agent, or Firm* — Sughrue Mion, PLLC

(57) ABSTRACT

A gateway is connected to a plurality of base stations and a core network. The gateway includes a receiver that receives, from the core network, a message establishing a communication path to any one of the plurality of base stations, wherein the message includes a received Access Point Name (APN). The gateway also includes a controller that determines, in response to the APN included in the massage, a destination of the message using information indicating a destination base station corresponding to the received APN.

6 Claims, 20 Drawing Sheets

GATEWAY, COMMUNICATION SYSTEM, METHOD OF CONTROLLING GATEWAY, AND COMPUTER READABLE MEDIUM THEREFOR

CROSS-REFERENCE TO RELATED APPLICATION

This application is based upon and claims the benefit of priority from Japanese patent application No. 2012-117401, filed on May 23, 2012, the disclosure of which is incorporated herein in its entirety by this reference.

BACKGROUND

Exemplary embodiments of the present invention relate to a gateway, a base station, a communication node, a communication system, and methods of controlling the gateway, the base station and the communication node. In particular, exemplary embodiments relate to a technique to use a femto system defined by 3GPP (3rd Generation Partnership Project) so as to realize remote IP (Internet Protocol) access from a macro network.

DESCRIPTION OF THE RELATED ART

The above-mentioned femto system is the generic term for access systems which include a Home Node B (HNB), a Home evolved Node B (HeNB), and a Gateway (HNB-GW and/or HeNB-GW).

The HNB is a small-sized radio base station which can be installed within end-user's premises or the like, and connects a mobile station (also referred to as User Equipment, or UE) compatible with a Universal Mobile Telecommunications System (UMTS) radio system in the 3GPP to a core network of a mobile operator through a public network such as a broadband IP backhaul. FIG. 1 shows a configuration of a communication system where four units of HNBs 20_1 to 20_4 (hereinafter collectively referred to using just reference numeral "20") are incorporated into a core network through a broadband IP backhaul 50, so that a UE 10 is connected to the core network.

The HNB-GW accommodates a plurality of HNBs connected through the public network, and relays traffic between each HNB and communication nodes such as a Mobile Switching Centre (MSC), a Serving GPRS (General Packet Radio Service) Support Node (SGSN), a Media Gateway (MGW), and a Gateway GPRS Support Node (GGSN), which form the core network. In the example of FIG. 1, a HNB-GW 60 relays traffic between each of the HNBs 20_1 to 20_4 and an SGSN 70, so that the UE 10 is connected to a Packet Data Network (PDN) 90 through a GGSN 80.

The HeNB is a small-sized radio base station which can be installed within end-user's premises or the like as with the HNB, and connects a UE compatible with a Long Term Evolution (LTE) radio system in the 3GPP to the core network of the mobile operator through the public network such as the broadband IP backhaul. FIG. 8 shows a configuration of a communication system where four units of HeNBs 120_1 to 120_4 (hereinafter, also collectively referred to by using a reference numeral "120") are incorporated into a core network through a broadband IP backhaul 150, so that a UE 110 is connected to the core network.

The HeNB-GW accommodates a plurality of HeNBs connected through the public network, and relays traffic between each HeNB and communication nodes such as a Mobility Management Entity (MME), a Serving Gateway (S-GW) and a PDN Gateway (P-GW), which form the core network. In the example of FIG. 8, a HeNB-GW 160 relays traffic between each of the HeNBs 120_1 to 120_4 and each of an MME 170 and an S-GW 171, so that the UE 110 is connected to a PDN 190 through a P-GW 180.

Note that details of the HNB, the HeNB, the HNB-GW, the HeNB-GW, the UE, the MSC, the MGW, the SGSN, the MME, the S-GW, the P-GW and the PDN are defined in various portions of 3GPP specifications including the following which are incorporated herein by the following specific references: 3GPP TS 23.401, "General Packet Radio Service (GPRS) enhancements for Evolved Universal Terrestrial Radio Access Network (E-UTRAN) access (Release 10)", V10.3.0, 2011-03, Clause 4.3.16, pp. 39 to 40, TS 22.220, TS 25.467, TS 23.002, TS 23.060, and TS 36.300.

Further, 3GPP TS 23.401 standardizes a Local IP Access (LIPA) function. This is a function for enabling a UE which camps on an HeNB to access a local network in which the HeNB is installed. Specifically, a Local Gateway (L-GW) which has the function equivalent to the P-GW is built in the HeNB. On demand from the UE, packets originated from the UE are directly routed within a local IP network to which the HeNB belongs through the L-GW function in the HeNB. In an example shown in FIG. 15, L-GWs 330_1 and 330_2 (hereinafter, also collectively referred to by using a reference numeral "330") are built in HeNBs 120_1 and 120_2 among HeNBs 120_1 to 120_3 which belong to a local IP network 130.

Similarly, in the communication system employing the UMTS radio system, the HNB includes an L-GW function which has the function equivalent to the GGSN, so that the LIPA function can be realized. In an example shown in FIG. 16, L-GWs 230_1 and 230_2 (hereinafter, also collectively referred to by using a reference numeral "230") are built in HeNBs 20_1 and 20_2 among HNBs 20_1 to 20_3 which belong to a local IP network 30.

On the other hand, the above-mentioned macro network is typically the generic term for access systems which include a RAN (Radio Access Network).

FIG. 17 shows a network configuration for access from the macro network to the PDN in the communication system employing the UMTS radio system. The UE 10 wirelessly connects to a Node B (NB) 420, and thus is connected to the PDN 90 through a Radio Network Controller (RNC) 430, the SGSN 70 and the GGSN 80. The RAN is formed by the NB and the RNC. The NB is a radio base station which is installed outdoors or the like by the mobile operator, and connects the UE compatible with the UMTS radio system to the core network. The RNC is a control device which accommodates a plurality of NBs and controls radio resources between each NB and the UE.

Further, FIG. 18 shows a network configuration for access from the macro network to the PDN in the communication system employing the LTE radio system. The UE 110 wirelessly connects to an evolved Node B (eNB) 520, and thus is connected to the PDN 190 through the S-GW 171 and the P-GW 180. The RAN is formed by the eNB. The eNB is a radio base station which is installed outdoors or the like by the mobile operator as with the NB, and connects the UE compatible with the LTE radio system to the core network.

Note that the coverage of a cell (generally, referred to as "macro cell") formed by each of the NB and the eNB is large, so that the number of UEs which can be accommodated in the cell is large. On the other hand, the coverage of a cell formed by each of the above-mentioned HNB and HeNB is quite smaller than that formed by each of the NB and the eNB. Therefore, this cell is generally referred to as "femto cell".

Incidentally, in 3GPP TSG-SA WG1 Meeting #51, S1-102154, "Remote Local IP access", it has been proposed that the LIPA function be used for remotely accessing, from the macro network, a local IP network to which the HeNB/HNB is connected. In the following explanation, this access is referred to as "remote IP access". The L-GW has the function equivalent to the P-GW and the GGSN. Therefore, the remote IP access can be realized in a case where when a UE attaching to the macro network requests access to the local IP network, the UE can connect to the L-GW having the function equivalent to the GGSN and the P-GW through the SGSN or the MME/S-GW, as in the case of normal packet communication. FIG. 19 shows a network configuration in a case of realizing the remote IP access in the communication system employing the UMTS radio system. FIG. 20 shows a network configuration in a case of realizing the remote IP access in the communication system employing the LTE radio system.

However, there is a problem that it is difficult to realize the remote IP access.

Specifically, in order to connect a communication pass from the SGSN or the S-GW to the L-GW, it is necessary to transmit a control message for establishing the communication path. Typically, in order to establish a communication path to the GGSN or the P-GW, the SGSN or the S-GW derives an IP address of a destination GGSN or P-GW by using an Access Point Name (APN) designated as the destination by a UE, and transmits a control message to the derived IP address. However, there are many cases where the HNB or the HeNB itself is connected to the local IP network and thus a private IP address is assigned to the HNB or the HeNB. Therefore, it is not possible to directly transmit the control message from the SGSN or the S-GW to the HNB or the HeNB. Even under circumstances where a public IP address is assigned to the HNB or the HeNB, there is a high possibility that the IP address is variable. Therefore, it is difficult for the SGSN or the S-GW to constantly derive the IP address of the HNB or the HeNB.

SUMMARY

Accordingly, an object of certain exemplary embodiments is to more easily realize remote IP access.

In order to achieve the above-mentioned object, a first exemplary aspect of certain exemplary embodiments is a gateway that establishes a secure tunnel between the gateway and each of a plurality of base stations through a public network. This gateway includes: a first communicator that communicates with each of the base stations through the secure tunnel; a second communicator that communicates with a core network; and a controller that controls the first and second communicators to relay traffic between the core network and each of the base stations. The controller is configured to: store an APN supported by each of the base stations, when each of the base stations includes a function of routing traffic received through the secure tunnel into a local network to which each of the base stations belongs; and transfer, when receiving from the core network a first message for establishing a communication path to any one of the plurality of base stations from a mobile station attaching to a RAN connected to the core network, the first message to a base station corresponding to a first APN included in the first message.

Further, a second exemplary aspect of certain exemplary embodiments is a base station that is incorporated into a core network through a public network. This base station includes: a communicator that establishes a secure tunnel between the base station and a gateway through the public network to communicate with the gateway; a router that routes traffic received through the secure tunnel into a local network to which the base station belongs; and a controller that controls the communicator and the router. The communicator is configured to receive, from the gateway, a first message for establishing a communication path to the base station from a mobile station attaching to a RAN connected to the core network. The controller is configured to cause, when the first message is received, the router to route traffic originated from the mobile station into the local network.

Further, a third exemplary aspect of certain exemplary embodiments is a communication node that is installed in a core network. This communication node includes: a first communicator that communicates with a gateway establishing a secure tunnel between the gateway and each of a plurality of base stations through a public network; a second communicator that communicates, through a RAN connected to the core network, with a mobile station attaching to the RAN; and a controller that controls the first and second communicators. The second communicator is configured to receive, from the mobile station, a first message for requesting access to one base station among the plurality of base stations. The controller is configured to: generate a second message for establishing a communication path from the mobile station to the one base station, and set in the second message an APN included in the first message; and transmit the second message to the gateway.

Further, a fourth exemplary aspect of certain exemplary embodiments is a communication system including: a communication node that is installed in a core network; and a gateway that establishes a secure tunnel between the gateway and each of a plurality of base stations through a public network. The communication node is configured to: receive, through a RAN connected to the core network, from a mobile station attaching to the RAN, a first message for requesting access to one base station among the plurality of base stations; generate a second message for establishing a communication path from the mobile station to the one base station, and set in the second message an APN included in the first message; and transmit the second message to the gateway. The gateway is configured to: store an APN supported by each of the base stations, when each of the base stations includes a function of routing traffic received through the secure tunnel into a local network to which each of the base stations belongs; and transfer, when the second message is received from the communication node, the second message to a base station corresponding to a first APN included in the second message.

Further, a fifth exemplary aspect of certain exemplary embodiments is a method of controlling a gateway that establishes a secure tunnel between the gateway and each of a plurality of base stations through a public network. This method includes: storing an APN supported by each of the base stations, when each of the base stations includes a function of routing traffic received through the secure tunnel into a local network to which each of the base stations belongs; and transferring, when receiving from the core network a first message for establishing a communication path to any one of the plurality of base stations from a mobile station attaching to a RAN connected to the core network, the first message to a base station corresponding to a first APN included in the first message.

Further, a sixth exemplary aspect of certain exemplary embodiments is a method of controlling a base station that is incorporated into a core network through a public network. This method includes: establishing a secure tunnel between the base station and a gateway through the public network to communicate with the gateway; receiving, from the gateway, a first message for establishing a communication path to the base station from a mobile station attaching to a RAN connected to the core network; and routing, when the first message is received, traffic received from the mobile station through the secure tunnel into a local network to which the radio base station belongs.

Furthermore, a seventh exemplary aspect of certain exemplary embodiments is a method of controlling a communication node that is installed in a core network. This method includes: receiving, through a RAN connected to the core network, from a mobile station attaching to the RAN, a first message for requesting access to one base station among a plurality of base stations that are incorporated into the core network through a public network; generating a second message for establishing a communication path from the mobile station to the one base station, and setting in the second message an APN included in the first message; and transmitting the second message to a gateway that establishes a secure tunnel between the gateway and each of the base stations through the public network.

According to certain exemplary embodiments, it is possible to more easily realize remote IP access.

BRIEF DESCRIPTION OF THE DRAWINGS

The above and other aspects, features, and advantages of certain exemplary embodiments will become more apparent from the following description, taken in conjunction with the accompanying drawings, in which.

DETAILED DESCRIPTION

Figure 1:
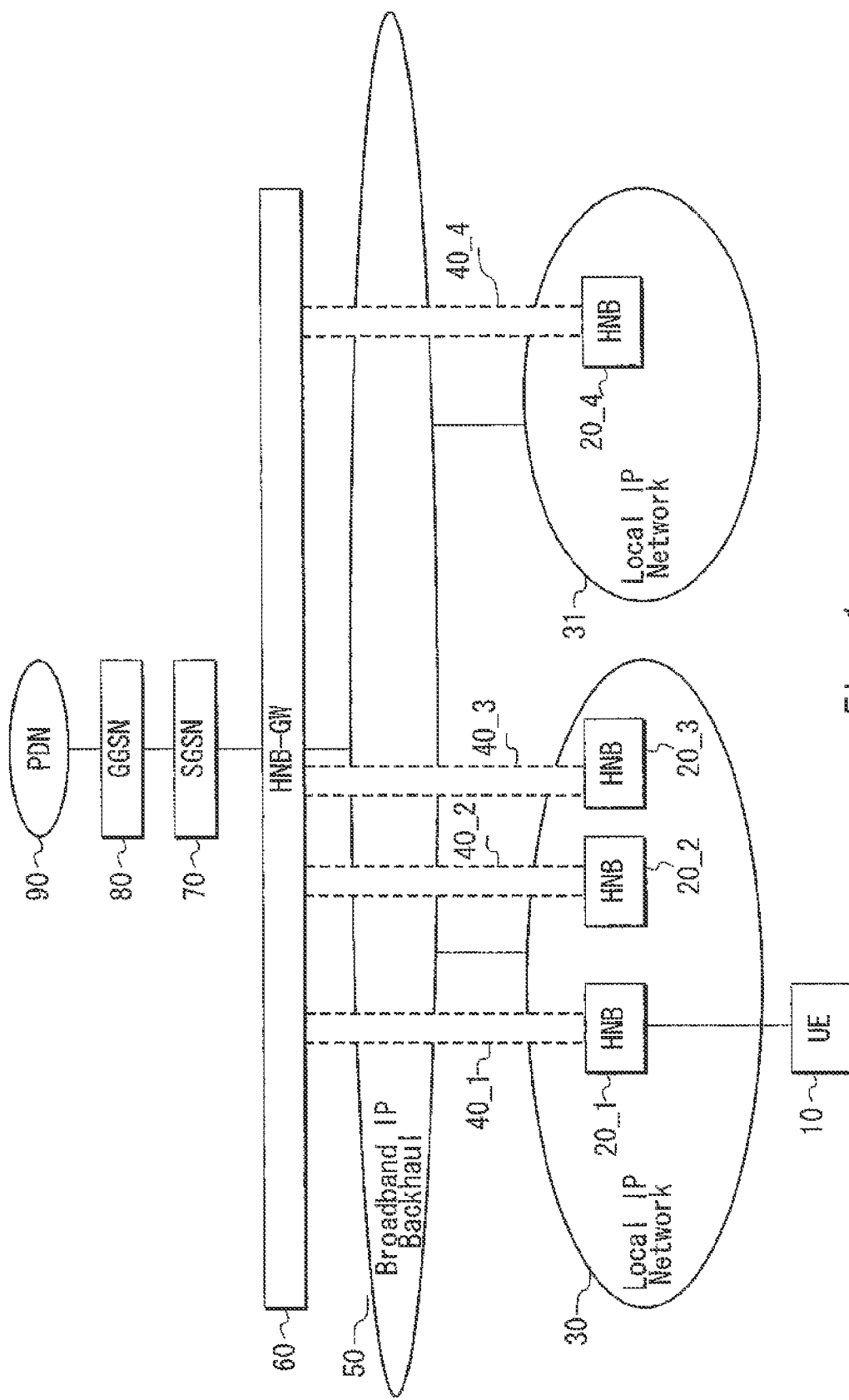
FIG. 1 is a block diagram showing a configuration example of a communication system to which a gateway, a base station and a communication node according to a first exemplary embodiment are applied.

Hereinafter, first to eighth exemplary embodiments of a gateway and a communication node according to certain exemplary embodiments, and a communication system to which these gateway and communication node are applied will be described with reference to FIGS. 1 to 14. Note that in the drawings, the same components are denoted by the same reference numerals and duplicated explanation is omitted as necessary for clarity of explanation. The word "exemplary" is used herein to mean "serving as an example, instance, or illustration". Any embodiment described herein as "exemplary" is not necessarily to be construed as preferred or advantageous over other embodiments.

[First Exemplary Embodiment]

As shown in FIG. 1, a communication system according to this exemplary embodiment includes an HNB-GW 60 and an SGSN 70.

Among them, the HNB-GW 60 relays traffic between a core network including the SGSN 70 and a GGSN 80, and HNBs 20_1 to 20_4 incorporated into the core network through a broadband IP backhaul 50 which is one of public networks. The L-GW having the function equivalent to the GGSN 80 is built in each of the HNBs 20_1 to 20_4, so that each of the HNBs 20_1 to 20_4 has the LIPA function.

Figure 2:
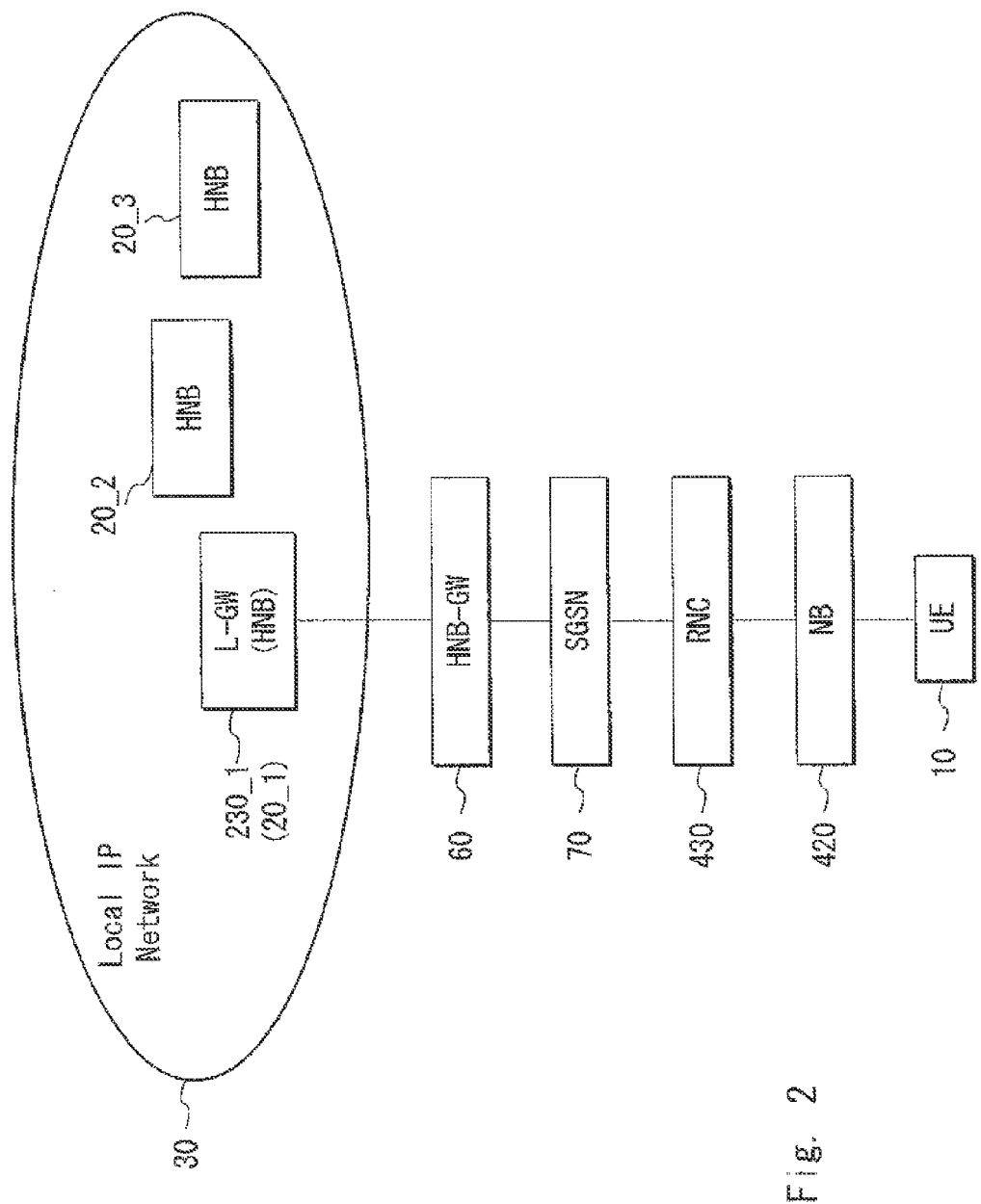
FIG. 2 is a block diagram showing an example of a network configuration in a case of realizing remote IP access in the communication system according to the first exemplary embodiment.

On the other hand, when a macro network (a UE 10 which attaches to a RAN including an NB 420 and an RNC 430 as shown in FIG. 2) requests remote IP access, the SGSN 70 cooperates with the HNB-GW 60 to establish a communication path from the UE 10 to the HNB 20.

In operations, as shown in FIG. 1, the HNB-GW 60 firstly establishes IPsec tunnels 40_1 to 40_4 (hereinafter, also collectively referred to by using a reference numeral "40") between the HNB-GW 60 and the HNBs 20_1 to 20_4. Next, the HNB 20 transmits an HNB Register Request message to the HNB-GW 60 through the IPsec tunnel 40. The HNB-GW 60 receives the HNB Register Request message, and then authenticates whether or not the HNB 20 is an allowable device which can be incorporated into the core network. As a result, in a case of succeeding in the authentication of the HNB 20, the HNB-GW 60 terminates the registration of the HNB 20, and sends an HNB Register Accept message back to the HNB 20.

A series of processes mentioned above are operations defined in the 3GPP specification. Meanwhile, the following processes will be executed as characteristic operations in this exemplary embodiment.

If the HNB 20 has the LIPA function, the HNB 20 includes an APN supported by the HNB 20 itself in the HNB Register Request message. The HNB-GW 60 stores this APN in association with an IP address of the HNB 20. The HNB-GW 60 sets, as the IP address of the HNB 20, e.g., a source IP address of the HNB Register Request message.

After that, if the UE 10 desires access to a local IP network, the UE 10 transmits a PDP (Packet Data Protocol) Activation Request message to the SGSN 70 through the RAN (the NB 420 and the RNC 430 shown in FIG. 2). At this time, the UE 10 includes the APN in the PDP Activation Request message.

The SGSN 70 receives the PDP Activation Request message, and then generates a PDP Create Request message. At this time, the SGSN 70 sets, in the PDP Activation Request message, the APN included in the PDP Activation Request message. Further, the SGSN 70 derives an IP address of the HNB-GW 60 by using the APN included in the PDP Activation Request message. Note that this derivation is performed as in the case where the SGSN derives an IP address of the GGSN. Therefore, the specific explanation thereof is omitted. Then, the SGSN 70 transmits the PDP Create Request message to the IP address of the HNB-GW 60.

When the HNB-GW 60 receives the PDP Create Request message, the HNB-GW 60 determines which L-GW (HNB) a communication path should be established to among the HNBs 20_1 to 20_4 by using the APN included in this message, and transfers the PDP Create Request message to an appropriate L-GW (HNB). Taking as an example a case where an APN supported by an L-GW 230_1 (HNB 20_1) is set as the APN included in the PDP Create Request message, the HNB-GW 60 identifies an IP address corresponding to this APN (IP address of the HNB 20_1) as shown in FIG. 2. Then, the HNB-GW 60 transfers the PDP Create Request message to the identified IP address.

According to a series of processes mentioned above, communication paths between elements from the local IP network to the UE are established.

Hereinafter, with reference to FIGS. 3 to 7, there will be described in detail specific configuration examples and operation examples of the HNB-GW 60, the HNB 20 and the SGSN 70 for materializing the above-mentioned operations.

Figure 3:
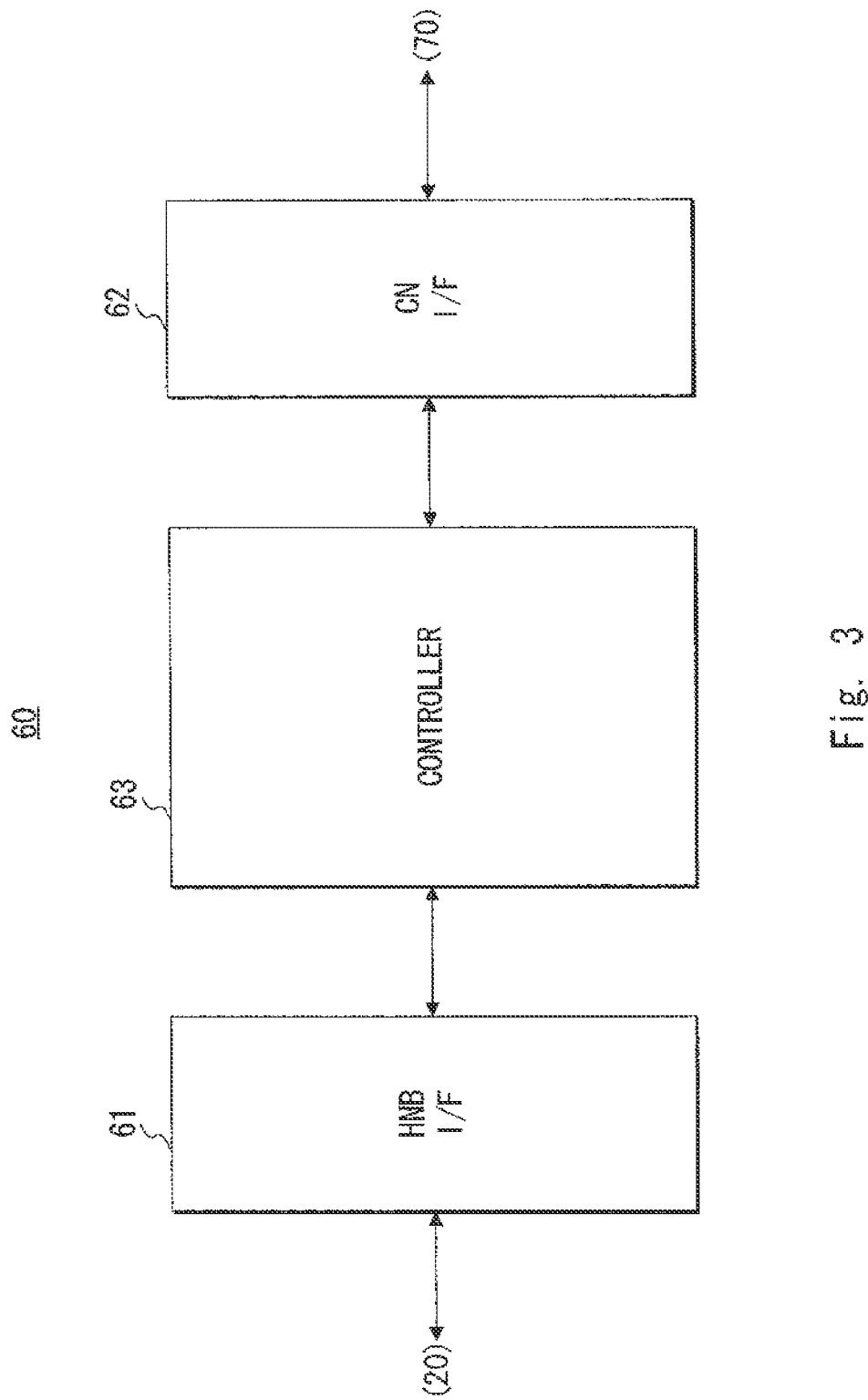
FIG. 3 is a block diagram showing a configuration example of the gateway according to the first exemplary embodiment.

As shown in FIG. 3, the HNB-GW 60 according to this exemplary embodiment includes an HNB I/F 61, a CN (Core Network) I/F 62, and a controller 63. The HNB I/F 61 communicates with the HNB 20 through the broadband IP backhaul 50. The CN I/G 62 communicates with the SGSN 70. The controller 63 controls the HNB I/F 61 and the CN I/F 62 to relay traffic between the HNB 20 and the SGSN 70. In other words, the controller 63 cooperates with the HNB I/F 61 and the CN I/F 62 to make the HNB-GW 60 function as with the typical HNB-GW. In addition, the controller 63 executes the process to store the APN supported by the HNB 20 in association with the IP address of the HNB 20, the process to identify the L-GW (HNB) to which the communication path should be established by using the APN included in the PDP Create Request message, the process to transfer the PDP Create Request message to the identified L-GW (HNB), and the like.

Figure 4:
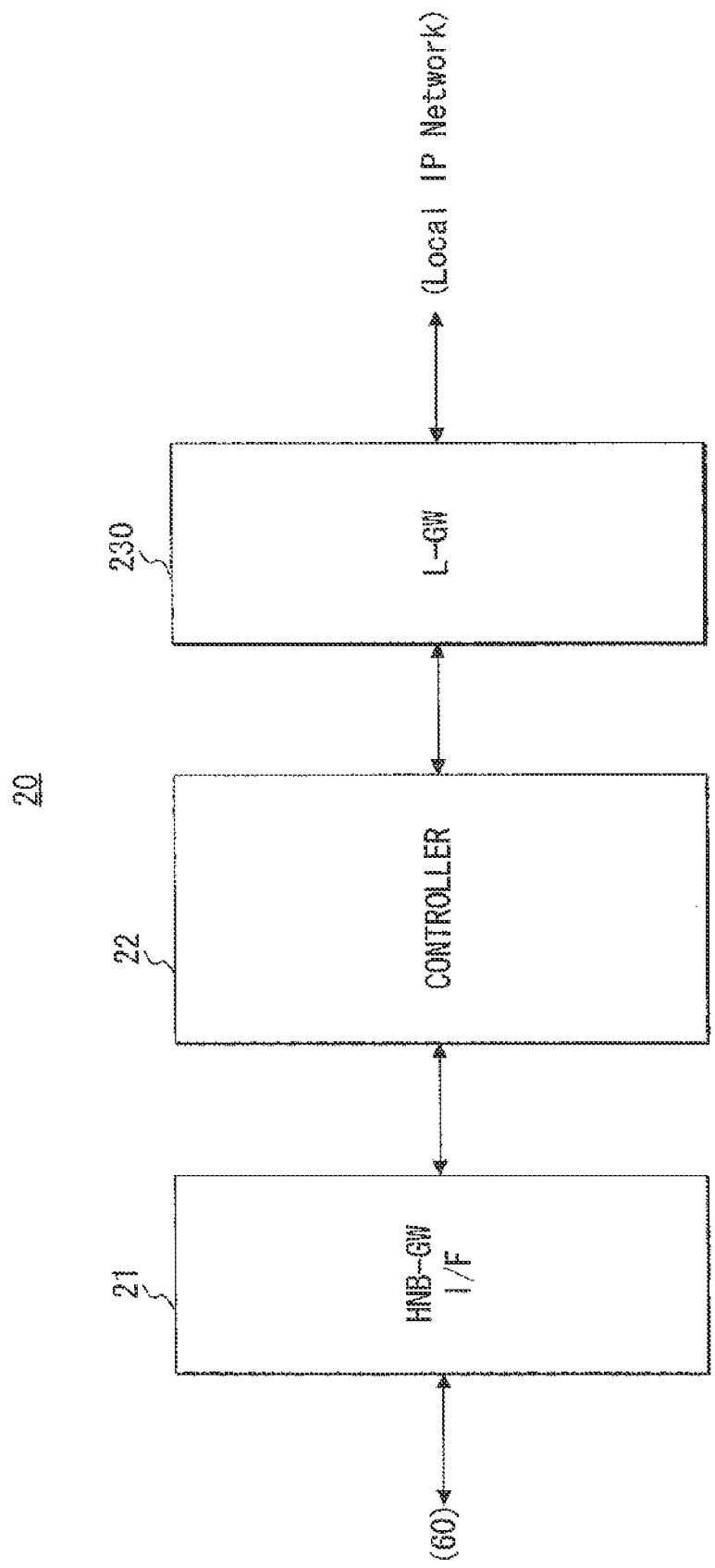
FIG. 4 is a block diagram showing a configuration example of the base station according to the first exemplary embodiment.

Further, as shown in FIG. 4, the HNB 20 according to this exemplary embodiment includes an HNB-GW I/F 21, an L-GW 230, and a controller 22. The HNB-GW I/F 21 communicates with the HNB-GW 60 through the broadband IP backhaul 50. The controller 22 controls the HNB-GW I/F 21 and the L-GW 230 to route packets originated from the UE 10 upon the remote IP access into the local IP network to which the HNB 20 belongs. Note that although the illustration is omitted, the HNB 20 also has the function of forming a femto cell to wirelessly communicate with the UE as with the typical HNB.

Figure 5:
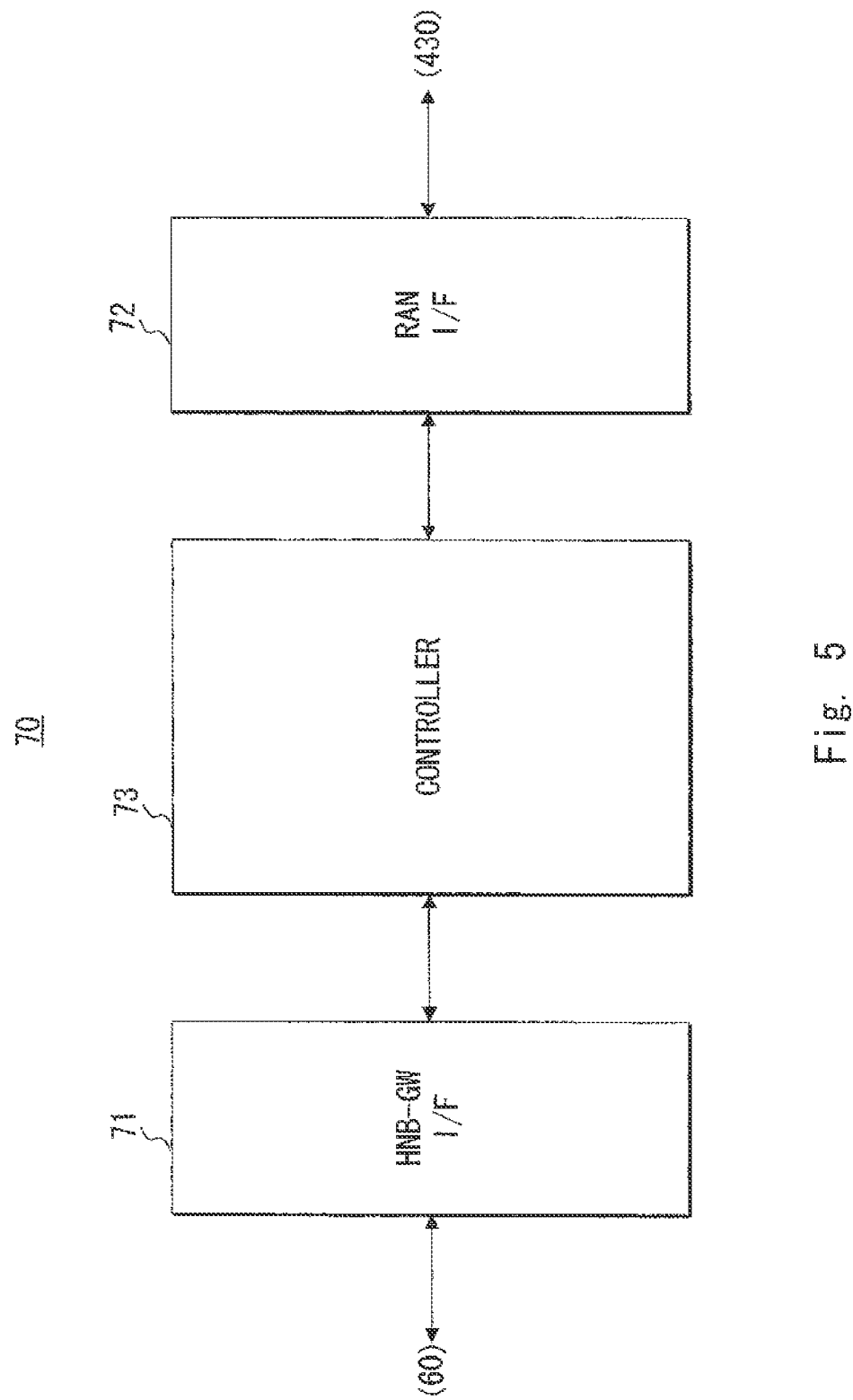
FIG. 5 is a block diagram showing a configuration example of the communication node according to the first exemplary embodiment.

Furthermore, as shown in FIG. 5, the SGSN 70 according to this exemplary embodiment includes an HNB-GW I/F 71, a RAN I/F 72, and a controller 73. The HNB-GW I/F 71 communicates with the HNB-GW 60. The RAN I/F 72 serves as the interface to the RNC 430 shown in FIG. 2, and thus communicates with the UE 10 through the RNC 430 and the NB 420 (i.e., the RAN). The controller 73 controls the HNB-GW I/F 71 and the RAN I/F 72, thereby making the SGSN 70 function as with the typical SGSN. In addition, the controller 73 executes the process to extract the APN from the PDP Activation Request message, the process to generate the PDP Create Request message and to set the extracted APN in this message, the process to derive the IP address of the HNB-GW 60 by using the extracted APN, the process to transmit the PDP Create Request message to the derived IP address, and the like.

Next, operation examples of the HNB-GW 60, the HNB 20 and the SGSN 70 will be described with reference to FIGS. 6 and 7.

Figure 6:
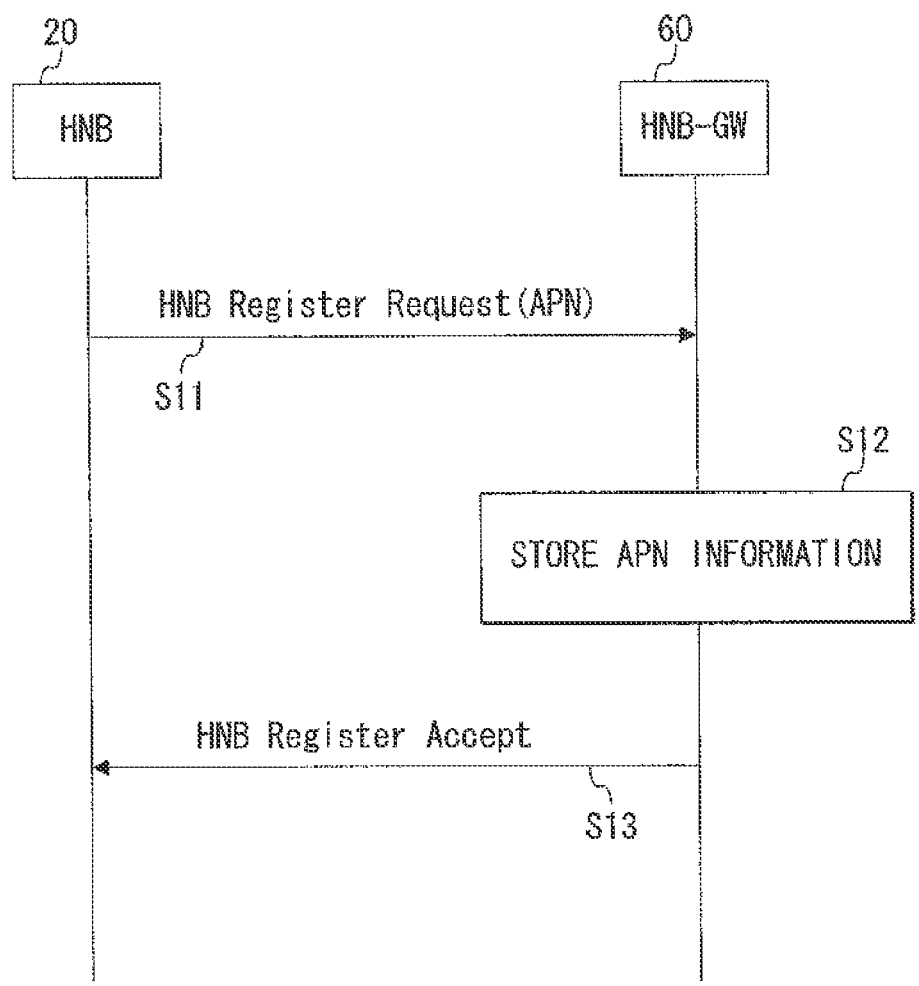
FIG. 6 is a sequence diagram showing an example of procedures to register a base station in the gateway according to the first exemplary embodiment.

As shown in FIG. 6, the HNB 20 transmits to the HNB-GW 60 the HNB Register Request message which includes the APN supported by the HNB 20 itself prior to starting communication with the HNB-GW 60 (Step S11).

The HNB I/F 61 in the HNB-GW 60 transfers the HNB Register Request message received from the HNB 20 to the controller 63. At this time, the controller 63 performs authentication for the HNB 20. As a result, upon succeeding in the authentication of the HNB 20, the controller 63 extracts the APN from the HNB Register Request message, and stores the extracted APN in association with the IP address of the HNB 20 (Step S12).

Note that in the following explanation, information on the associated APN and IP address is also referred to as "APN information".

Then, the controller 63 in the HNB-GW 60 terminates the registration of the HNB 20, and generates the HNB Register Accept message. Further, the controller 63 causes the HNB I/F 61 to transmit the generated HNB Register Accept message to the HNB 20 (Step S13).

Figure 7:
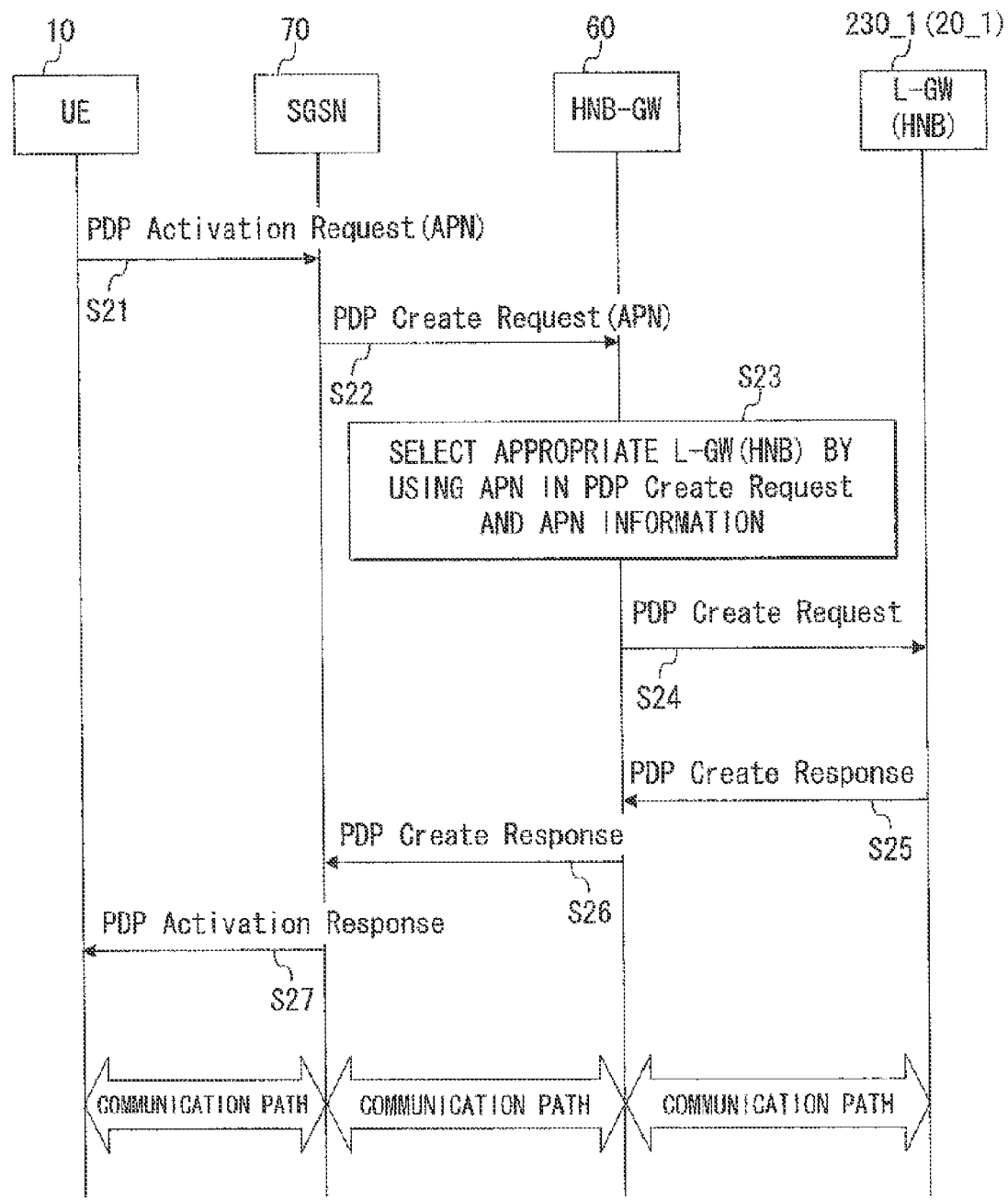
FIG. 7 is a sequence diagram showing an example of procedures to establish a communication path in the gateway, the base station and the communication node according to the first exemplary embodiment.

As shown in FIG. 7, if the UE 10 desires access to the local IP network, the UE 10 transmits to the SGSN 70 the PDP Activation Request message which includes an APN supported by a certain HNB. Assume that the UE 10 desires access to the L-GW 230_1 (HNB 20_1) within the local IP network 30. In this case, the UE 10 includes the APN supported by the HNB 20_1 in the PDP Activation Request message (Step S21).

The RAN I/F 72 in the SGSN 70 transfers the PDP Activation Request message received from the UE 10 to the controller 73. The controller 73 generates the PDP Create Request message, and sets the APN extracted from the PDP Activation Request message in this PDP Create Request message. Further, the controller 73 derives the IP address of the HNB-GW 60 by using the extracted APN. Then, the controller 73 causes the HNB-GW I/F 71 to transmit the PDP Create Request message to the derived IP address (Step S22).

The CN I/F 62 in the HNB-GW 60 transfers the PDP Create Request message received from the SGSN 70 to the controller 63. The controller 63 selects an appropriate L-GW (HNB) by using the APN included in the PDP Create Request message and the APN information. Now, the PDP Create Request message includes the APN supported by the HNB 20_1. Therefore, the controller 63 selects the IP address of the L-GW 230_1 (HNB 20_1) corresponding to this APN (Step S23).

Then, the controller 63 causes the HNB I/F 61 to transmit the PDP Create Request message to the selected IP address (Step S24).

The L-GW 230_1 (HNB 20_1) receives the PDP Create Request message, and then sends a PDP Create Response message back to the HNB-GW 60 (Step S25).

Thus, a communication path is established between the HNB-GW 60 and the L-GW 230_1.

Next, the HNB-GW 60 transmits the PDP Create Response message to the SGSN 70 (Step S26).

Thus, a communication path is established between the SGSN 70 and the HNB-GW 60.

Finally, the SGSN 70 transmits a PDP Activation Response message to the UE 10 (Step S27).

Thus, a communication path is established between the UE 10 and the SGSN 70.

According to the above-mentioned processes, the communication paths between elements from the local IP network to the UE are established, so that the remote IP access can be realized.

As mentioned above, according to this exemplary embodiment, the following first to fourth effects can be achieved.

It is difficult for the typical SGSN to directly transmit the control message for establishing the communication path to the HNB, due to the assignment of the private IP address or the variable public IP address to the HNB. However, in this exemplary embodiment, it is possible to establish the communication path to the HNB by the simple mechanism to include the APN supported by the HNB in the control message, so that it is possible to achieve the first effect that the remote IP access can be easily realized.

Further, in this exemplary embodiment, the control message and the communication path are transmitted and established within the IPsec tunnel between the HNB-GW and the HNB. Therefore, it is possible to achieve the second effect to avoid the risk of communication contents being intercepted by third persons.

Further, the HNB is the device installed within end-user's premises or the like. In some cases, there may exist a maliciously modified device. The typical SGSN does not have the function of authenticating the destination device, and therefore may establish a communication path to such a malicious HNB. However, in this exemplary embodiment, at the time when the SGSN transmits the PDP Create Request message to the HNB-GW, the HNB-GW has already authenticated the HNB. Therefore, it is possible to achieve the third effect that a communication path to an allowable L-GW (HNB) can be established without implementing the function of authenticating the HNB in the SGSN.

Furthermore, upon establishing the communication path between the HNB and the SGSN, the typical SGSN needs to notify its IP address to the HNB. The SGSN is a communication node which accommodates communication paths for a large number of users. Therefore, there is a critical security problem in notifying the IP address of such a communication node to the HNB installed within end-user's premises. However, in this exemplary embodiment, it is not necessary to notify the IP address of the SGSN to the HNB. Therefore, it is possible to achieve the fourth effect to improve security as compared with the case of notifying the IP address of the SGSN to the HNB.

[Second Exemplary Embodiment]

A communication system, an HNB-GW, an HNB and an SGSN according to this exemplary embodiment can be configured as with the above-mentioned first exemplary embodiment. Meanwhile, this exemplary embodiment is different from the above-mentioned first exemplary embodiment, in that the controller in the HNB-GW preliminarily stores the APN supported by each HNB in association with the IP address of each HNB prior to starting communication with each HNB.

Specifically, the HNB 20 does not notify the HNB-GW 60 of the APN supported by the HNB 20 itself, unlike the example shown in FIG. 6 in the registration procedures for the HNB 20. Alternatively, in the HNB-GW 60, the APN information is preliminarily stored as a database by e.g., an operator.

The HNB-GW 60 receives the PDP Create Request message from the SGSN 70 as in the case shown in FIG. 7, and then refers to the database by using the APN included in the PDP Create Request message, thereby selecting the appropriate L-GW (HNB).

Thus, in this exemplary embodiment, it is not necessary to notify the APN from the HNB to the HNB-GW. Therefore, it is possible to achieve the effect that the remote IP access can be realized without modifying the existing HNB registration procedure. It is also possible to achieve the effect to reduce the amount of traffic between the HNB and the HNB-GW as compared with the above-mentioned first exemplary embodiment.

[Third Exemplary Embodiment]

A communication system, an HNB-GW, an HNB and an SGSN according to this exemplary embodiment can be configured as with the above-mentioned first exemplary embodiment. Meanwhile, this exemplary embodiment is different from the above-mentioned first exemplary embodiment, in that the PDP Create Request message includes a CSG (Closed Subscriber Group)-ID, and that the controller in the HNB-GW stores the APN supported by each HNB further in association with a CSG-ID and transfers the PDP Create Request message to the HNB when the CSG-ID included in the PDP Create Request message coincides with the stored CSG-ID. Note that the term CSG indicates that only a specific group of users (group of UEs) is allowed to access a specific HNB installed within a certain local IP network. The UE can access the specific HNB by using a CSG-ID preliminarily assigned thereto.

Specifically, in the registration procedure shown in FIG. 6, the HNB 20 further includes the CSG-ID in the HNB Register Request message.

The HNB-GW 60 receives the HNB Register Request message from the HNB 20, and then stores, as an information element of the APN information, the CSG-ID included in this message.

On the other hand, upon transmitting the PDP Activation Request message shown in FIG. 7, the UE 10 includes the CSG-ID in the PDP Activation Request message.

The SGSN 70 extracts the APN and the CSG-ID from the PDP Activation Request message received from the UE 10.

Then, the SGSN 70 sets the extracted APN and CSG-ID in the PDP Create Request message to be transmitted to the HNB-GW 60.

The HNB-GW 60 selects the appropriate L-GW (HNB) by using the APN included in the PDP Create Request message as in the case shown in FIG. 7. Meanwhile, when a CSG-ID stored in association with this APN coincides with the CSG-ID included in the PDP Create Request message (in other words, when the UE 10 is allowed to access the selected L-GW (HNB)), the HNB-GW 60 transfers the PDP Create Request message to the selected L-GW (HNB). On the other hand, when both CSG-IDs do not coincide with each other (in other words, when the UE 10 is not allowed to access the selected L-GW (HNB)), the HNB-GW 60 does not transfer the PDP Create Request message.

Thus, in this exemplary embodiment, it is possible to achieve the effect that the remote IP access can be performed only for an allowable UE which is allowed to access the HNB.

Note that it is not essential to notify the CSG-ID from the HNB to the HNB-GW. The CSG-ID may be preliminarily stored in the database as with the above-mentioned second exemplary embodiment. In this case, the above-mentioned effect can be similarly achieved. In addition, it is also possible to achieve the effect that it is not necessary to modify the existing HNB registration procedure and that the amount of traffic between the HNB and the HNB-GW can be reduced.

[Fourth Exemplary Embodiment]

A communication system, an HNB-GW, an HNB and an SGSN according to this exemplary embodiment can be configured as with the above-mentioned first exemplary embodiment. Meanwhile, this exemplary embodiment is different from the above-mentioned first exemplary embodiment, in that the controller in the HNB-GW further stores information indicating whether or not each HNB has the LIPA function (hereinafter, this information will be referred to as "function information"), and transfers the PDP Create Request message only to the HNB whose corresponding function information indicates "presence of LIPA function".

According to this exemplary embodiment, even under circumstances where an HNB which has the LIPA function and an HNB which does not have the LIPA function are mixed, it is possible to achieve the effect to appropriately select the HNB having the LIPA function upon the remote IP access.

Note that the function information may be notified from the HNB to the HNB-GW in the HNB registration procedure, or may be preliminarily set in the database. In both cases, the above-mentioned effect can be similarly achieved. In the latter case, it is also possible to achieve the effect that it is not necessary to modify the existing HNB registration procedure and that the amount of traffic between the HNB and the HNB-GW can be reduced.

[Fifth Exemplary Embodiment]

Each of the above-mentioned first to fourth exemplary embodiments deals with the communication system employing the UMTS radio system. However, the gateway, the base station and the communication node according to exemplary embodiment can also be applied to a communication system employing the LTE radio system.

Figure 8:
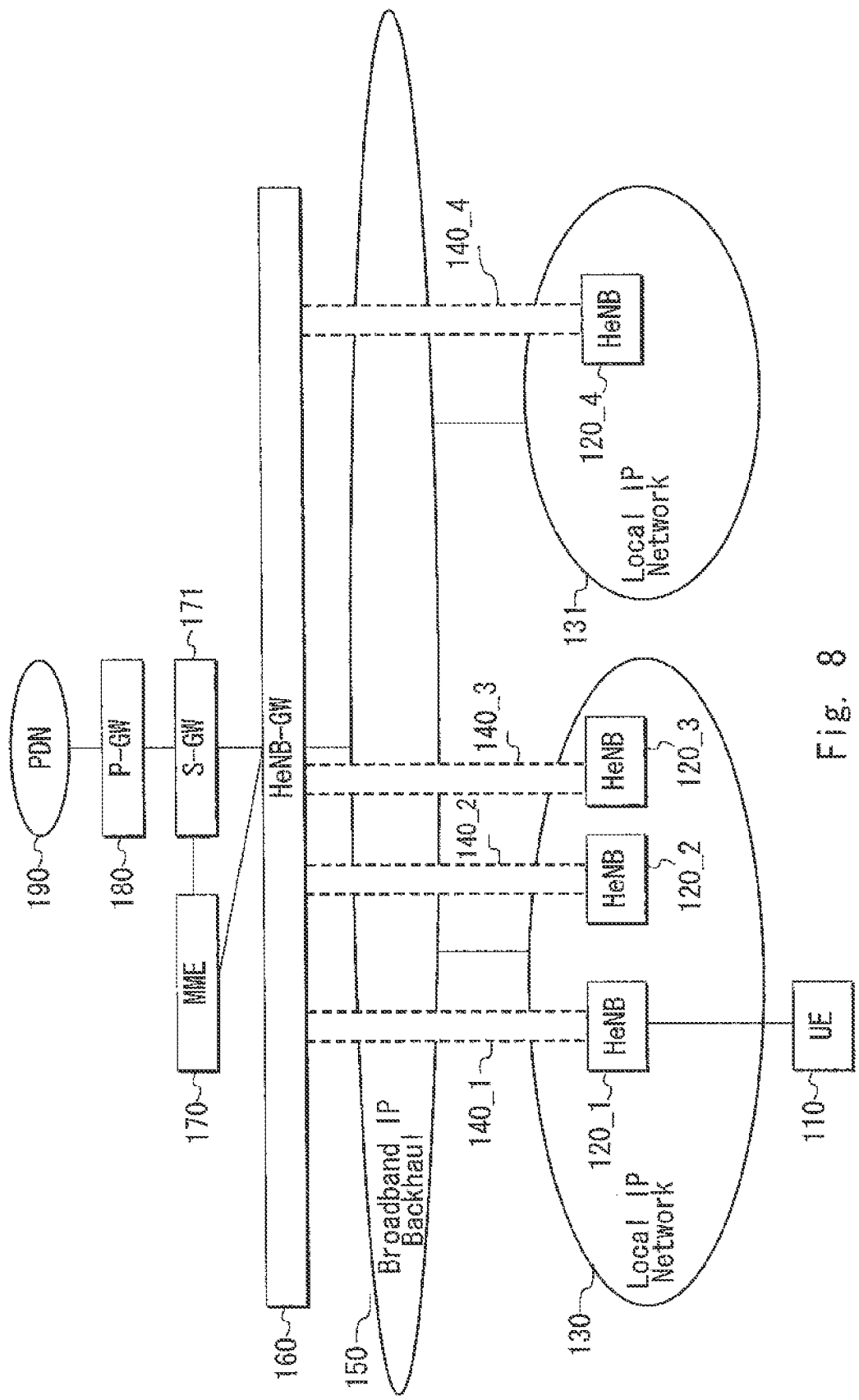
FIG. 8 is a block diagram showing a configuration example of a communication system to which a gateway, a base station and a communication node according to a fifth exemplary embodiment of the invention are applied.

As shown in FIG. 8, a communication system according to this exemplary embodiment includes an HeNB-GW 160 and an S-GW 171.

Among them, the HeNB-GW 160 relays traffic between a core network including an MME 170, the S-GW 171 and a P-GW 180, and HeNBs 120_1 to 120_4 incorporated into the core network through a broadband IP backhaul 150. The L-GW having the function equivalent to the P-GW 180 is built in each of the HeNBs 120_1 to 120_4, so that each of the HeNBs 120_1 to 120_4 has the LIPA function.

Figure 9:
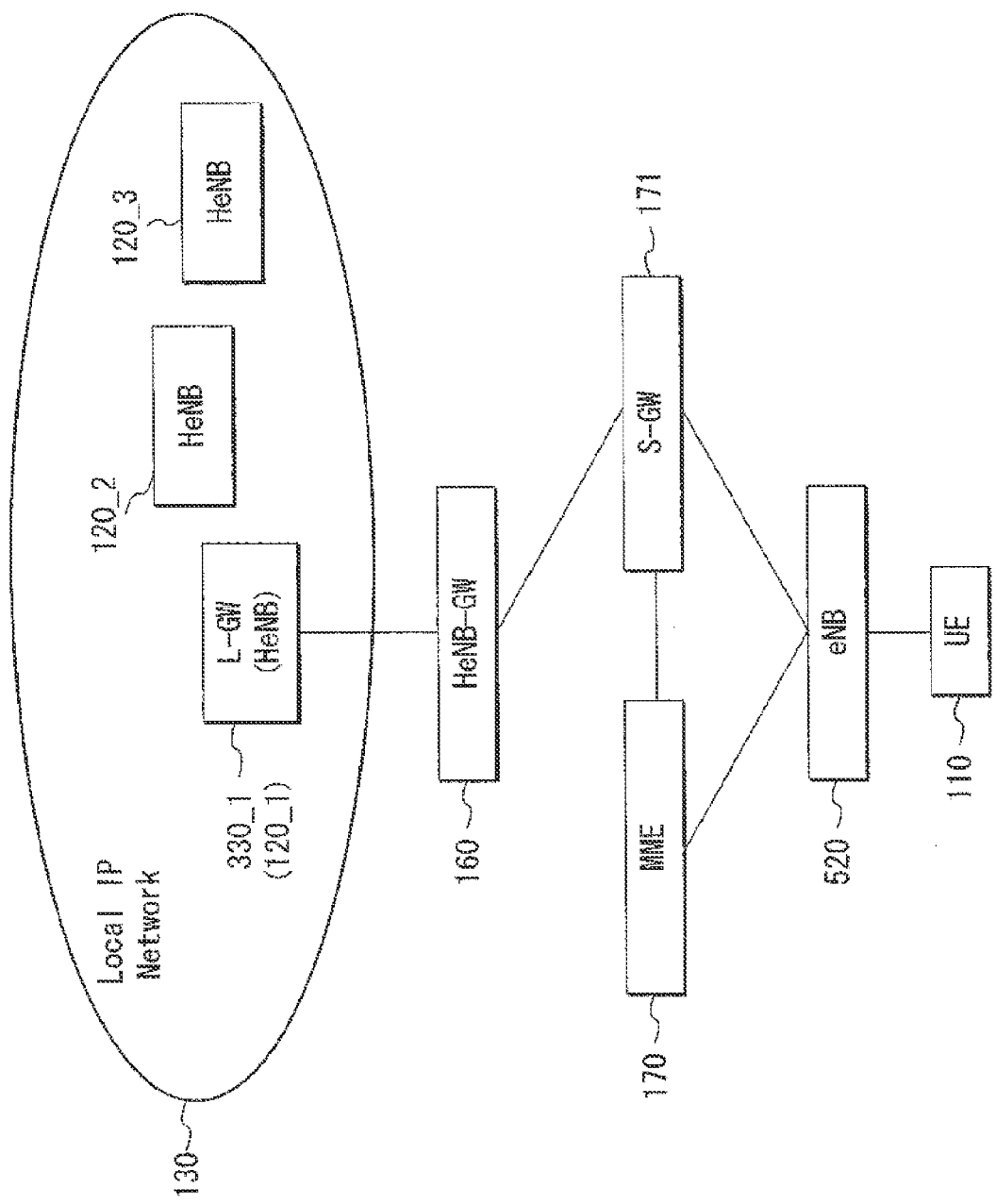
FIG. 9 is a block diagram showing an example of a network configuration in a case of realizing remote IP access in the communication system according to the fifth exemplary embodiment.

On the other hand, when a macro network (a UE 110 which attaches to a RAN including an eNB 520 as shown in FIG. 9) requests remote IP access, the S-GW 170 cooperates with the HeNB-GW 160 to establish a communication path from the UE 110 to the HeNB 120.

In operations, as shown in FIG. 8, the HeNB-GW 160 firstly establishes IPsec tunnels 140_1 to 140_4 (hereinafter, also collectively referred to by using a reference numeral "140") between the HeNB-GW 160 and the HeNBs 120_1 to 120_4. Next, the HeNB 120 transmits an S1 Establishment Request message to the HeNB-GW 160 through the IPsec tunnel 140. The HeNB-GW 160 receives the S1 Establishment Request message, and then authenticates whether or not the HeNB 120 is an allowable device which can be incorporated into the core network. As a result, in a case of succeeding in the authentication of the HeNB 120, the HeNB-GW 160 transfers the S1 Establishment Request message to the MME 170. The HeNB-GW 160 receives an S1 Establishment Response message from the MME 170, and then transfers this S1 Establishment Response message to the HeNB 120.

A series of processes mentioned above are operations defined in the 3GPP specification. Meanwhile, the following processes will be executed as characteristic operations in this exemplary embodiment.

If the HeNB 120 has the LIPA function, the HeNB 120 includes an APN supported by the HeNB 120 itself in the S1 Establishment Request message. The HeNB-GW 160 stores this APN in association with an IP address of the HeNB 120. The HeNB-GW 160 sets, as the IP address of the HeNB 120, e.g., a source IP address of the S1 Establishment Request message.

After that, if the UE 110 desires access to a local IP network, the UE 110 transmits a PDN Connectivity Request message to the MME 170 through the RAN (the eNB 520 shown in FIG. 9). At this time, the UE 110 includes the APN in the PDN Connectivity Request message. The MME 170 receives the PDN Connectivity Request message, and then transmits a Create Session Request message to the S-GW 171. At this time, the MME 170 sets, in the Create Session Request message, the APN included in the PDN Connectivity Request message.

The S-GW 171 receives the Create Session Request message, and then derives an IP address of the HeNB-GW 160 by using the APN included in the Create Session Request message. Note that this derivation is performed as in the case where the S-GW derives an IP address of the P-GW. Therefore, the specific explanation thereof is omitted. Then, the S-GW 171 transfers the Create Session Request message to the IP address of the HeNB-GW 160.

When the HeNB-GW 160 receives the Create Session Request message, the HeNB-GW 160 determines which L-GW (HeNB) a communication path should be established to among the HeNBs 120_1 to 120_4 by using the APN included in this message, and transfers the Create Session Request message to an appropriate L-GW (HeNB). Taking as an example a case where an APN supported by an L-GW 330_1 (HeNB 120_1) is set as the APN included in the Create Session Request message, the HeNB-GW 160 identifies an IP address corresponding to this APN (IP address of the HeNB 120_1) as shown in FIG. 9. Then, the HeNB-GW 160 transfers the Create Session Request message to the identified IP address.

According to a series of processes mentioned above, communication paths between elements from the local IP network to the UE are established.

Hereinafter, with reference to FIGS. 10 to 14, there will be described in detail specific configuration examples and operation examples of the HeNB-GW 160, the HeNB 120 and the S-GW 171 for materializing the above-mentioned operations.

Figure 10:
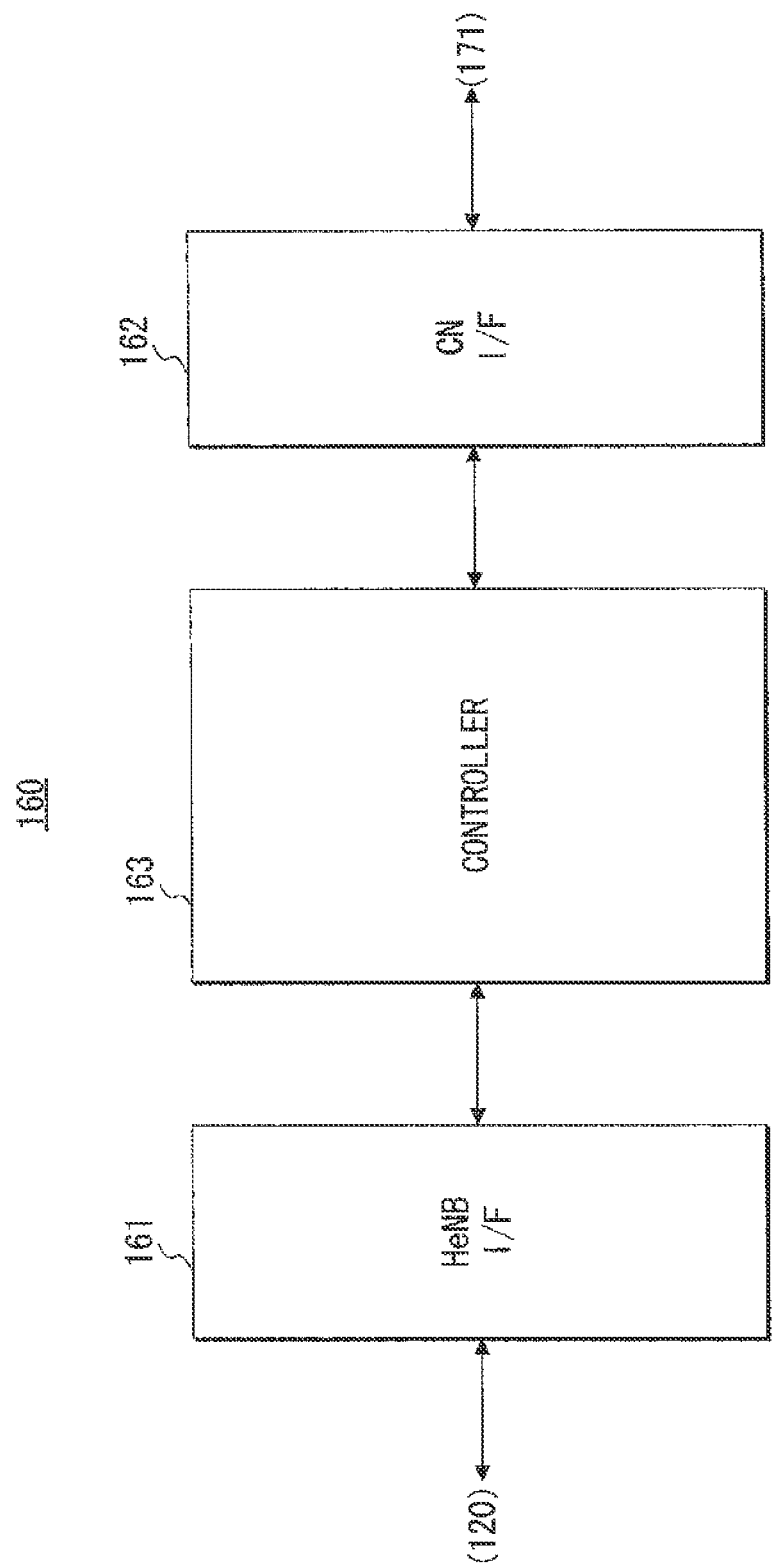
FIG. 10 is a block diagram showing a configuration example of the gateway according to the fifth exemplary embodiment.

As shown in FIG. 10, the HeNB-GW 160 according to this exemplary embodiment includes an HeNB I/F 161, a CN (Core Network) I/F 162, and a controller 163. The HeNB I/F 161 communicates with the HeNB 120 through the broadband IP backhaul 150. The CN JIG 162 communicates with the S-GW 171. The controller 163 controls the HeNB I/F 161 and the CN I/F 162 to relay traffic between the HeNB 20 and the S-GW 171. In other words, the controller 163 cooperates with the HeNB I/F 161 and the CN I/F 162 to make the HeNB-GW 160 function as with the typical HeNB-GW. In addition, the controller 163 executes the process to store the APN supported by the HeNB 120 in association with the IP address of the HeNB 120, the process to identify the L-GW (HeNB) to which the communication path should be established by using the APN included in the Create Session Request message, the process to transfer the Create Session Request message to the identified L-GW (HeNB), and the like.

Figure 11:
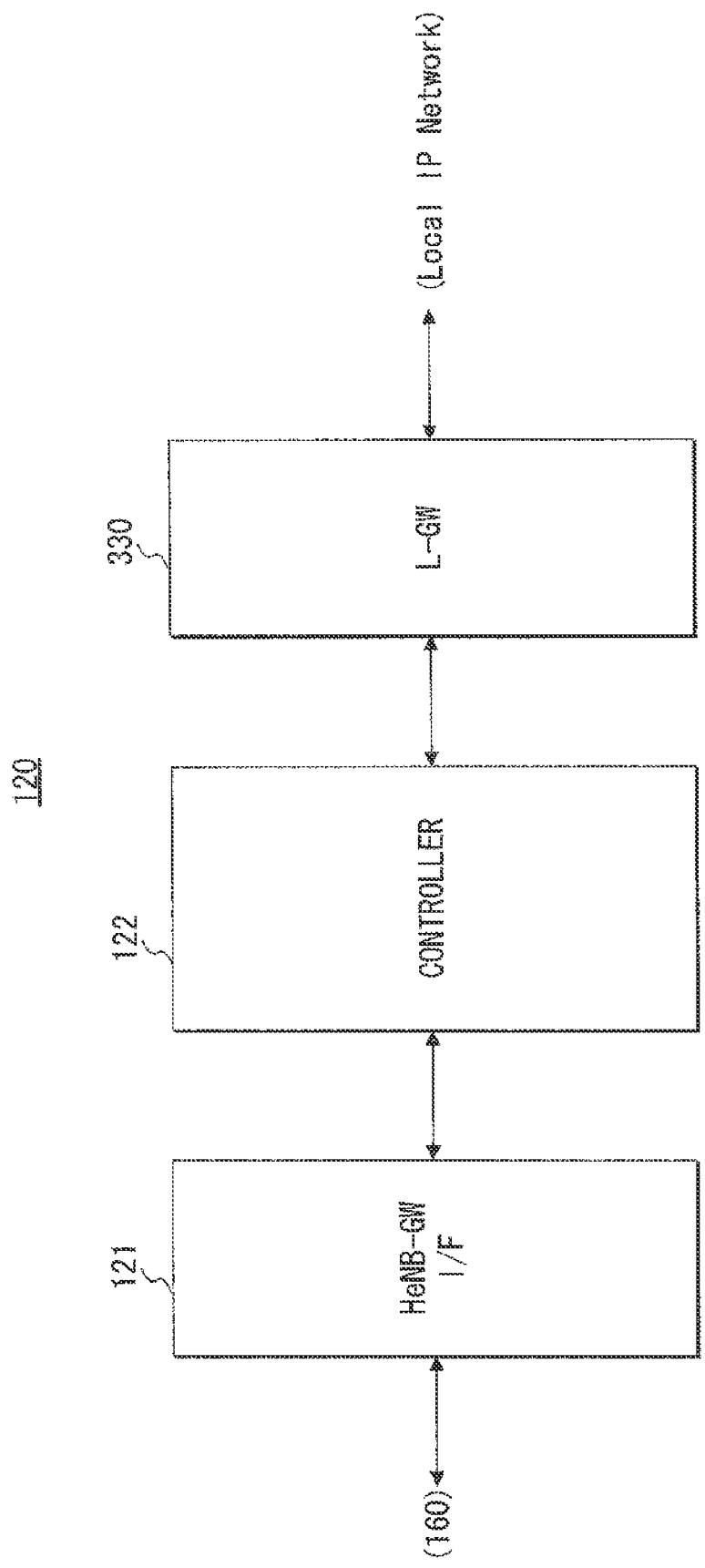
FIG. 11 is a block diagram showing a configuration example of the base station according to the fifth exemplary embodiment.

Further, as shown in FIG. 11, the HeNB 120 according to this exemplary embodiment includes an HeNB-GW I/F 121, an L-GW 330, and a controller 122. The HeNB-GW I/F 121 communicates with the HeNB-GW 160 through the broadband IP backhaul 150. The controller 122 controls the HeNB-GW I/F 121 and the L-GW 330 to route packets originated from the UE 110 upon the remote IP access into the local IP network to which the HeNB 120 belongs. Note that although the illustration is omitted, the HeNB 120 also has the function of forming a femto cell to wirelessly communicate with the UE as with the typical HeNB.

Figure 12:
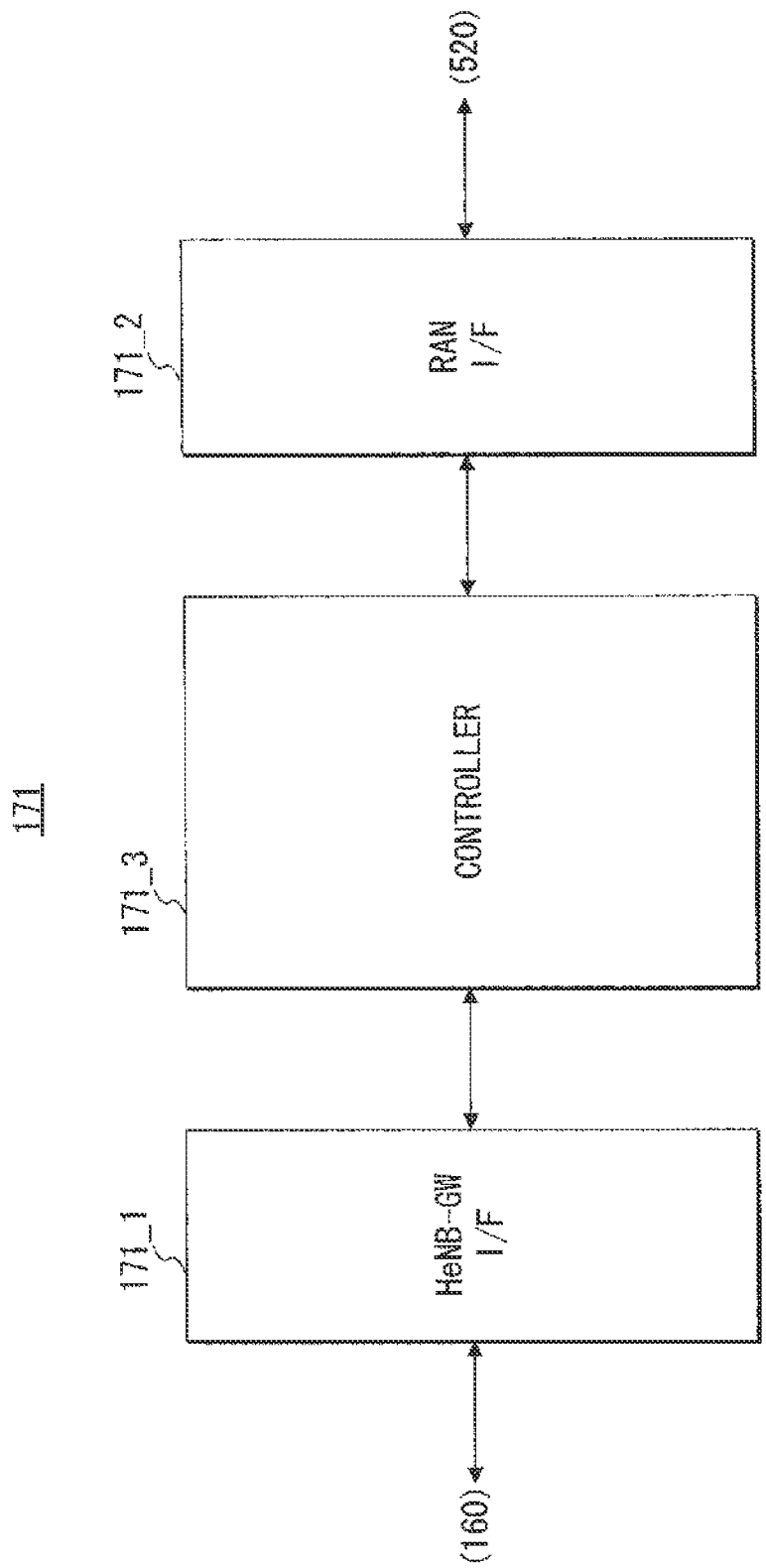
FIG. 12 is a block diagram showing a configuration example of the communication node according to the fifth exemplary embodiment.

Furthermore, as shown in FIG. 12, the S-GW 171 according to this exemplary embodiment includes an HeNB-GW I/F 171_1, a RAN I/F 171_2, and a controller 171_3. The HeNB-GW I/F 171_1 communicates with the HeNB-GW 160. The RAN I/F 171_2 serves as the interface to the eNB 520 shown in FIG. 8, and thus communicates with the UE 110 through the eNB 520 (i.e., the RAN). The controller 171_3 controls the HeNB-GW I/F 171_1 and the RAN I/F 171_2, thereby making the S-GW 171 function as with the typical S-GW. In addition, the controller 171_3 executes the process to extract the APN from the Create Session Request message, the process to derive the IP address of the HeNB-GW 160 by using the extracted APN, the process to transfer the Create Session Request message to the derived IP address, and the like.

Next, operation examples of the HeNB-GW 160, the HeNB 120 and the S-GW 171 will be described with reference to FIGS. 13 and 14.

Figure 13:
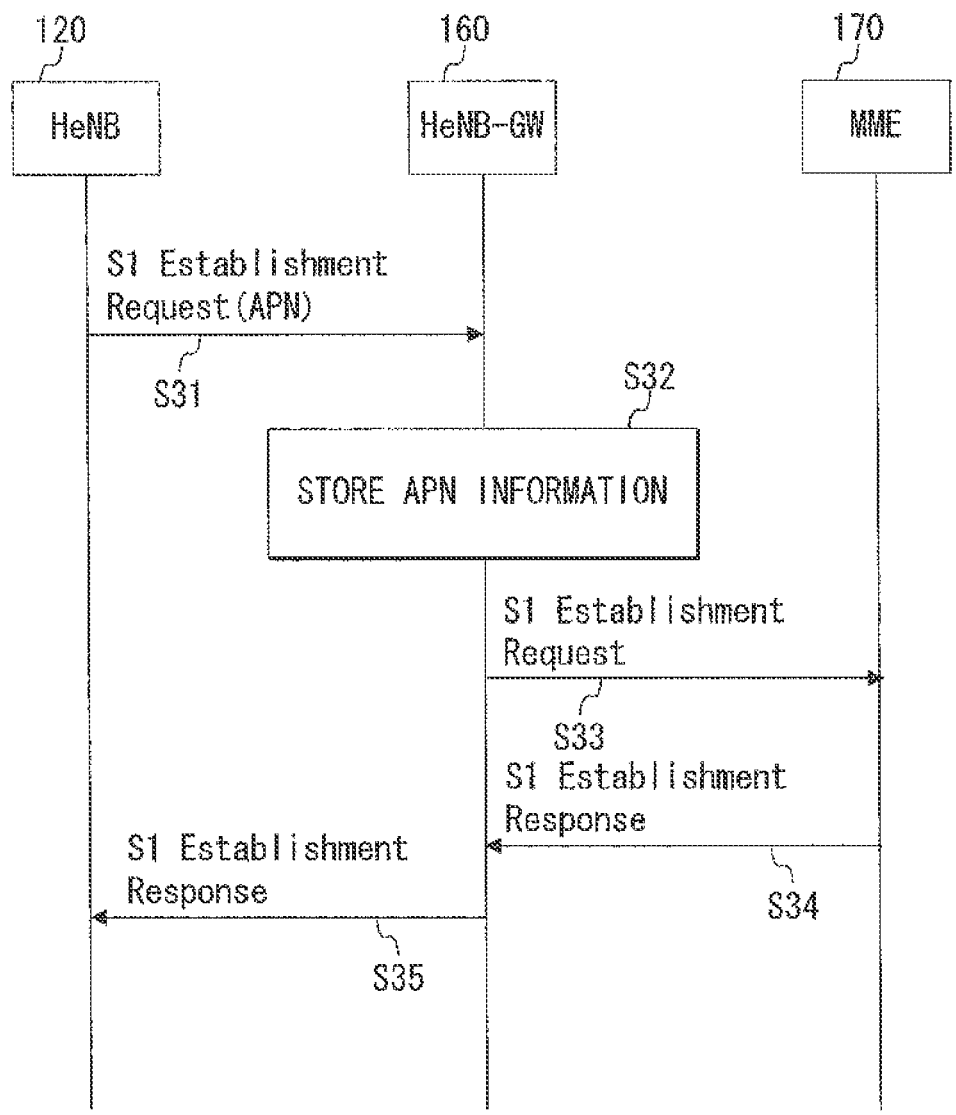
FIG. 13 is a sequence diagram showing an example of procedures to register a base station in the gateway according to the fifth exemplary embodiment.

As shown in FIG. 13, the HeNB 120 transmits to the HeNB-GW 160 the S1 Establishment Request message which includes the APN supported by the HeNB 120 itself prior to starting communication with the HeNB-GW 160 (Step S31).

The HeNB I/F 161 in the HeNB-GW 160 transfers the S1 Establishment Request message received from the HeNB 120 to the controller 163. At this time, the controller 163 performs authentication for the HeNB 120. As a result, upon succeeding in the authentication of the HeNB 120, the controller 163 extracts the APN from the S1 Establishment Request message, and stores, as the APN information, the extracted APN in association with the IP address of the HeNB 120 (Step S32).

Then, the controller 163 in the HeNB-GW 160 transfers the S1 Establishment Request message to the MME 170 (Step S33).

The CN I/F 162 in the HeNB-GW 160 receives the S1 Establishment Response message from the MME 170, and then transfers the S1 Establishment Response message to the controller 163 (Step S34).

At this time, the controller 163 in the HeNB-GW 160 causes the HeNB I/F 161 to transfer the S1 Establishment Response message to the HeNB 120 (Step S35).

Figure 14:
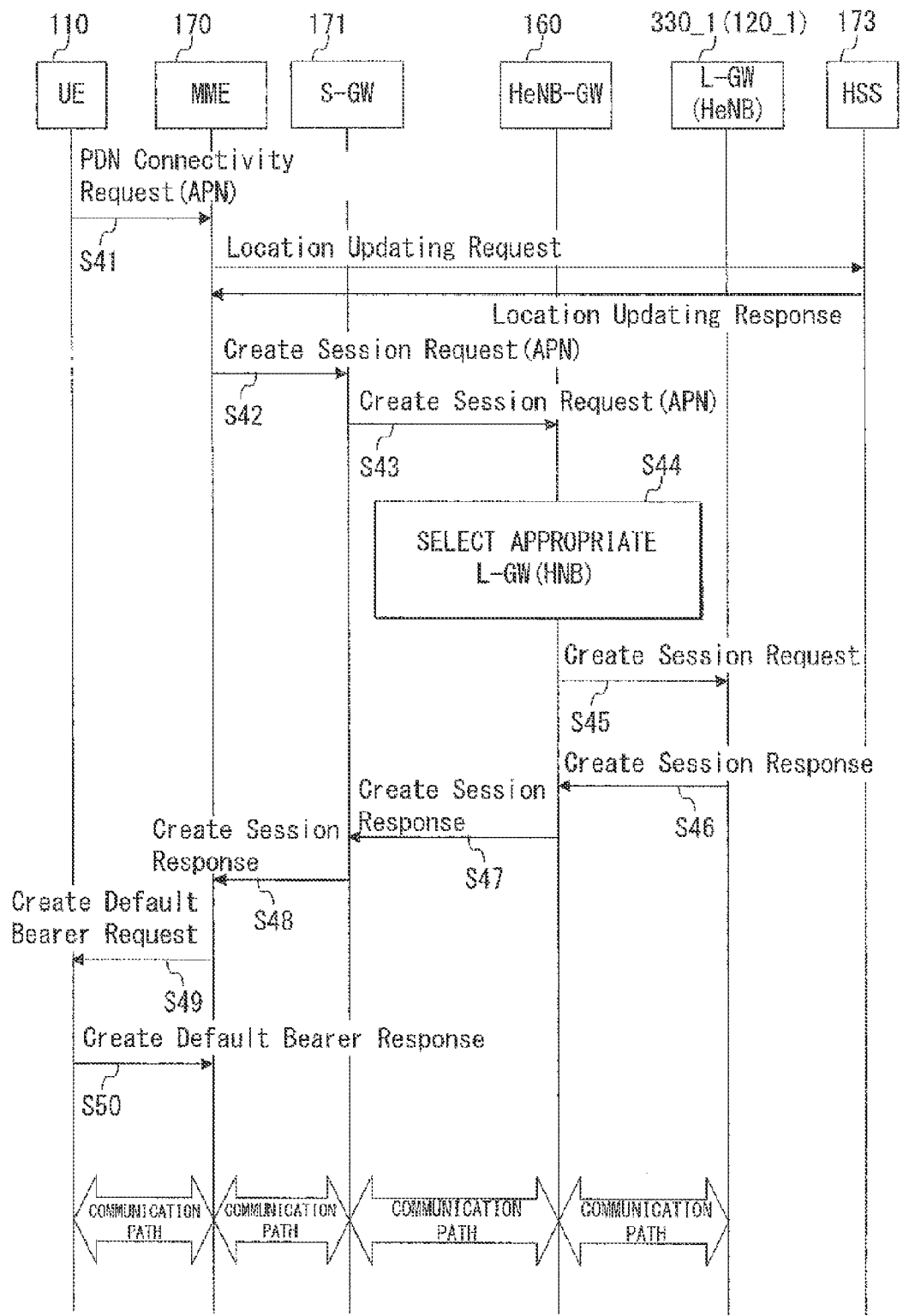
FIG. 14 is a sequence diagram showing an example of procedures to establish a communication path in the gateway, the base station and the communication node according to the fifth exemplary embodiment.
Figure 15:
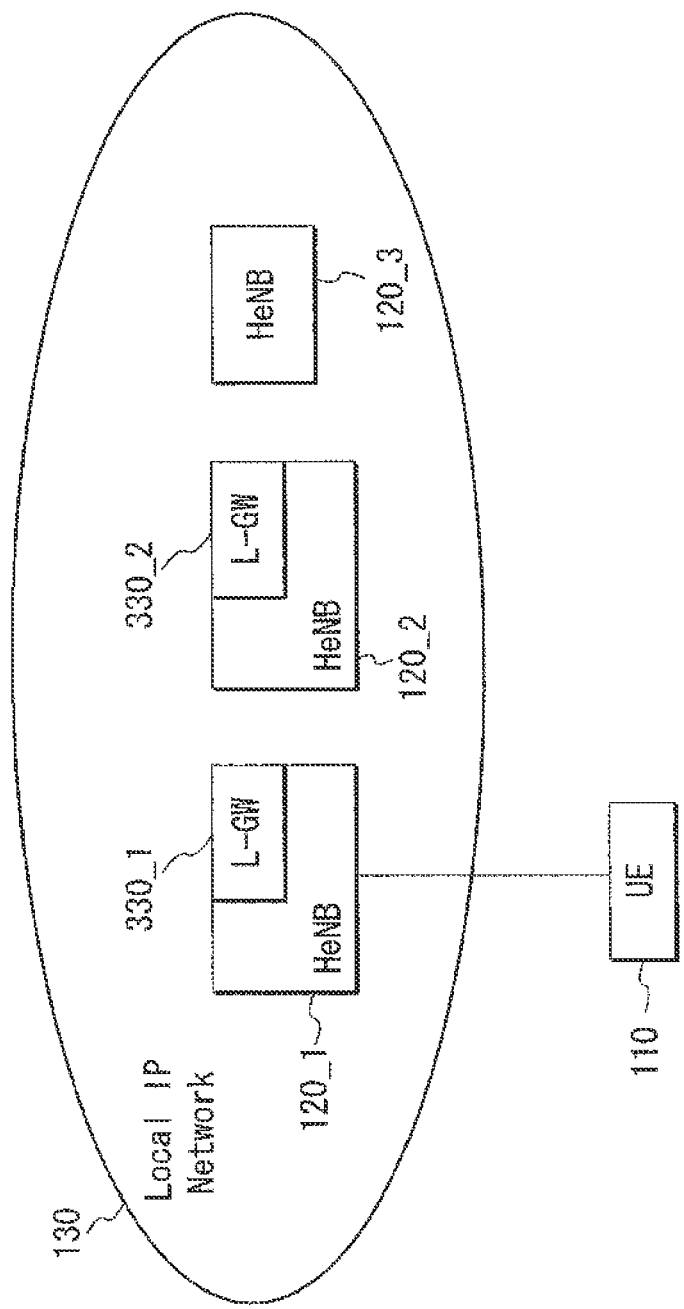
FIG. 15 is a block diagram showing an example of realizing a LIPA function in a typical communication system employing an LTE radio system.
Figure 16:
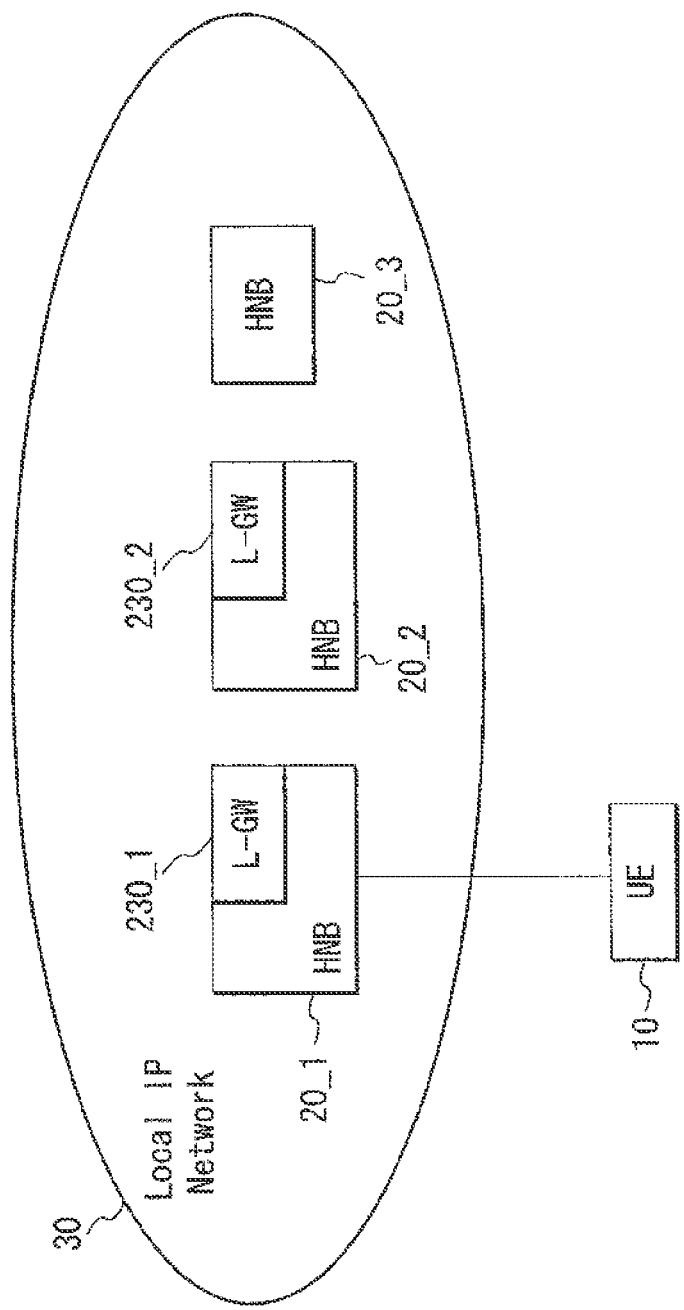
FIG. 16 is a block diagram showing an example of realizing a LIPA function in a typical communication system employing a UMTS radio system.
Figure 17:
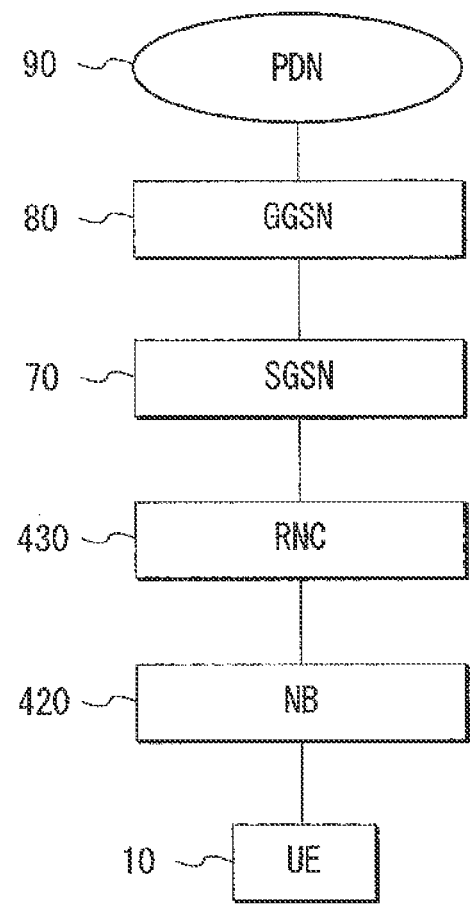
FIG. 17 is a block diagram showing an example of a network configuration for access from a macro network to a PDN in the typical communication system employing the UMTS radio system.
Figure 18:
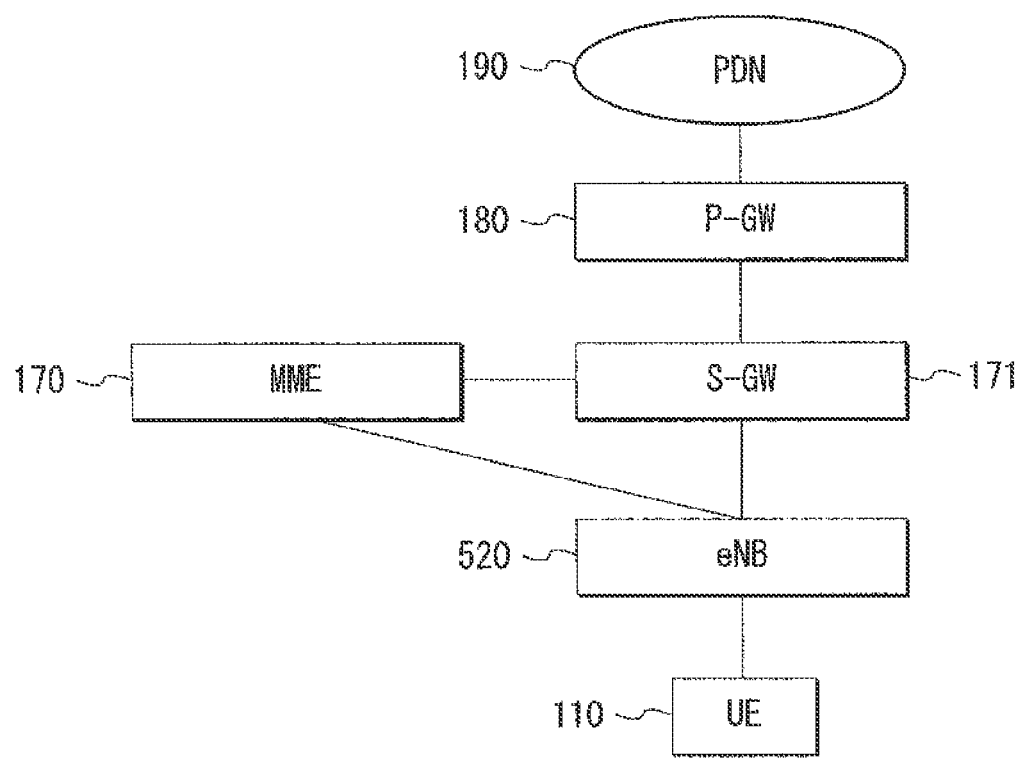
FIG. 18 is a block diagram showing an example of a network configuration for access from a macro network to a PDN in the typical communication system employing the LTE radio system.
Figure 19:
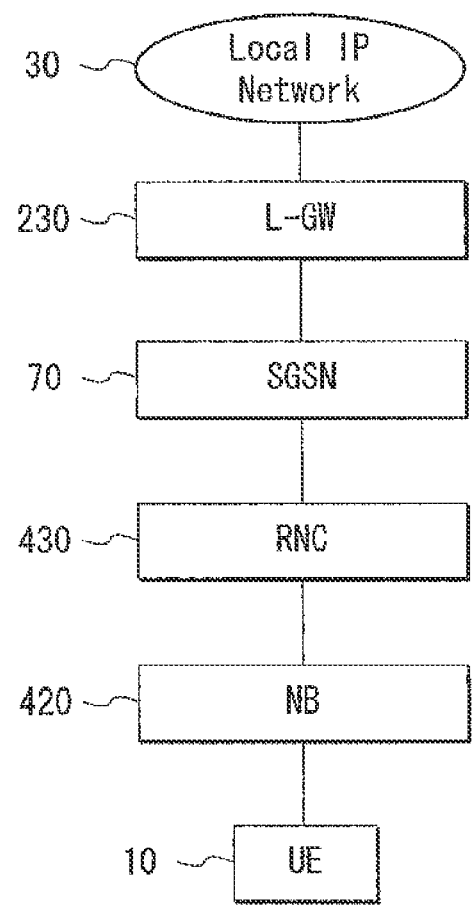
FIG. 19 is a block diagram showing an example of a network configuration in a case of realizing remote IP access in the typical communication system employing the UMTS radio system.
Figure 20:
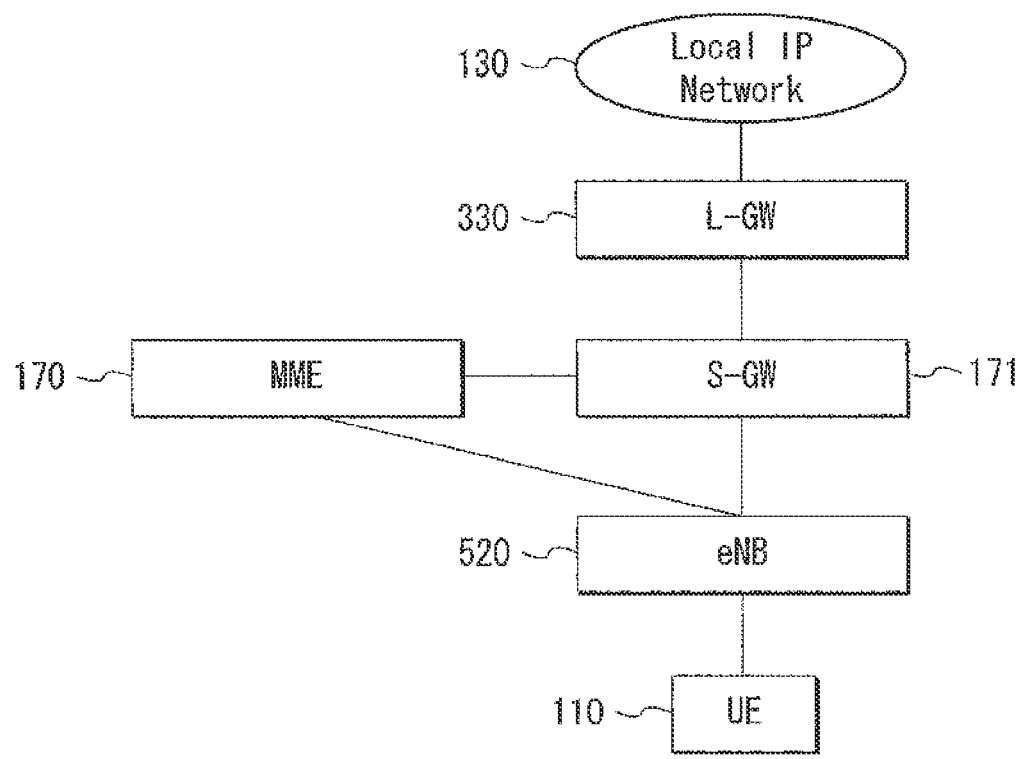
FIG. 20 is a block diagram showing an example of a network configuration in a case of realizing remote IP access in the typical communication system employing the LTE radio system.

As shown in FIG. 14, if the UE 110 desires access to the local IP network, the UE 110 transmits to the MME 170 the PDN Connectivity Request message which includes an APN supported by a certain HeNB. Assume that the UE 110 desires access to the L-GW 330_1 (HeNB 120_1) within the local IP network 130. In this case, the UE 110 includes the APN supported by the HeNB 120_1 in the PDN Connectivity Request message (Step S41).

The MME 170 receives the PDN Connectivity Request message, and then transmits a Location Updating Request message to an HSS (Home Subscriber Server) 173. When the MME 170 receives a Location Updating Response message from the HSS 173, the MME 170 generates the Create Session Request message, and sets, in this Create Session Request message, the APN extracted from the PDN Connectivity Request message, an APN received from the HSS 173, or an APN included in another message received from the UE 110.

Then, the MME 170 transmits the Create Session Request message to the S-GW 171 (Step S42).

The RAN I/F 171_2 in the S-GW 171 transfers the Create Session Request message received from the MME 170 to the controller 171_3. The controller 171_3 derives the IP address of the HeNB-GW 160 by using the APN extracted from the Create Session Request message. Then, the controller 171_3 causes the HeNB-GW I/F 171_1 to transfer the Create Session Request message to the derived IP address (Step S43).

The CN I/F 162 in the HeNB-GW 160 transfers the Create Session Request message from the S-GW 171 to the controller 163. The controller 163 selects an appropriate L-GW (HeNB) by using the APN included in the Create Session Request message and the APN information. Now, the Create Session Request message includes the APN supported by the HeNB 120_1. Therefore, the controller 163 selects the IP address of the L-GW 330_1 (HeNB 120_1) corresponding to this APN (Step S44).

Then, the controller 163 causes the HeNB I/F 161 to transfer the Create Session Request message to the selected IP address (Step S45).

The L-GW 330_1 (HeNB 120_1) receives the Create Session Request message, and then sends a Create Session Response message back to the HeNB-GW 160 (Step S46).

Thus, a communication path is established between the HeNB-GW 160 and the L-GW 330_1.

Next, the HeNB-GW 160 transmits the Create Session Response message to the S-GW 171 (Step S47).

Thus, a communication path is established between the S-GW 171 and the HeNB-GW 160.

Next, the S-GW 171 transmits the Create Session Response message to the MME 170 (Step S48).

Thus, a communication path is established between the MME 170 and the S-GW 171.

Finally, the MME 170 transmits a Create Default Bearer Request message to the UE 110 (Step S49), and receives, as a response thereto, a Create Default Bearer Response message from the UE 110 (Step S50).

Thus, a communication path is established between the UE 110 and the MME 170.

According to the above-mentioned processes, the communication paths between elements from the local IP network to the UE are established, so that the remote IP access can be realized.

As mentioned above, according to this exemplary embodiment, the following fifth to eighth effects can be achieved.

It is difficult for the typical S-GW to directly transmit the control message for establishing the communication path to the HeNB, due to the assignment of the private IP address or the variable public IP address to the HeNB. However, in this exemplary embodiment, it is possible to establish the communication path to the HeNB by the simple mechanism to include the APN supported by the HeNB in the control message, so that it is possible to achieve the fifth effect that the remote IP access can be easily realized.

Further, in this exemplary embodiment, the control message and the communication path are transmitted and established within the IPsec tunnel between the HeNB-GW and the HeNB. Therefore, it is possible to achieve the sixth effect to avoid the risk of communication contents being intercepted by third persons.

Further, the HeNB is the device installed within end-user's premises or the like. In some cases, there may exist a maliciously modified device. The typical S-GW does not have the function of authenticating the destination device, and therefore may establish a communication path to such a malicious HeNB. However, in this exemplary embodiment, at the time when the S-GW transmits the Create Session Request message to the HeNB-GW, the HeNB-GW has already authenticated the HeNB. Therefore, it is possible to achieve the seventh effect that a communication path to an allowable L-GW (HeNB) can be established without implementing the function of authenticating the HeNB in the S-GW.

Furthermore, upon establishing the communication path between the HeNB and the S-GW, the typical S-GW needs to notify its IP address to the HeNB. The S-GW is a communication node which accommodates communication paths for a large number of users. Therefore, there is a critical security problem in notifying the IP address of such a communication node to the HeNB installed within end-user's premises. However, in this exemplary embodiment, it is not necessary to notify the IP address of the S-GW to the HeNB. Therefore, it is possible to achieve the eighth effect to improve security as compared with the case of notifying the IP address of the S-GW to the HeNB.

[Sixth Exemplary Embodiment]

A communication system, an HeNB-GW, an HeNB and an S-GW according to this exemplary embodiment can be configured as with the above-mentioned fifth exemplary embodiment. Meanwhile, this exemplary embodiment is different from the above-mentioned fifth exemplary embodiment, in that the controller in the HeNB-GW preliminarily stores the APN supported by each HeNB in association with the IP address of each HeNB prior to starting communication with each HeNB.

Specifically, the HeNB 120 does not notify the HeNB-GW 160 of the APN supported by the HeNB 120 itself, unlike the example shown in FIG. 13 in the S1 establishment procedures for the HeNB 120. Alternatively, in the HeNB-GW 160, the APN information is preliminarily stored as a database by e.g., an operator.

The HeNB-GW 160 receives the Create Session Request message from the S-GW 171 as in the case shown in FIG. 14, and then refers to the database by using the APN included in the Create Session Request message, thereby selecting the appropriate L-GW (HeNB).

Thus, in this exemplary embodiment, it is not necessary to notify the APN from the HeNB to the HeNB-GW. Therefore, it is possible to achieve the effect that the remote IP access can be realized without modifying the existing 51 establishment procedure. It is also possible to achieve the effect to reduce the amount of traffic between the HeNB and the HeNB-GW as compared with the above-mentioned fifth exemplary embodiment.

[Seventh Exemplary Embodiment]

A communication system, an HeNB-GW, an HeNB and an S-GW according to this exemplary embodiment can be configured as with the above-mentioned fifth exemplary embodiment. Meanwhile, this exemplary embodiment is different from the above-mentioned fifth exemplary embodiment, in that the Create Session Request message includes a CSG-ID, and that the controller in the HeNB-GW stores the APN supported by each HeNB further in association with a CSG-ID and transfers the Create Session Request message to the HeNB when the CSG-ID included in the Create Session Request message coincides with the stored CSG-ID. Note that the term CSG in this exemplary embodiment indicates that only a specific group of users (group of UEs) is allowed to access a specific HeNB installed within a certain local IP network. The UE can access the specific HeNB by using a CSG-ID preliminarily assigned thereto.

Specifically, in the S1 establishment procedure shown in FIG. 13, the HeNB 120 further includes the CSG-ID in the S1 Establishment Request message.

The HeNB-GW 160 receives the S1 Establishment Request message from the HeNB 120, and then stores, as an information element of the APN information, the CSG-ID included in this message.

On the other hand, upon transmitting the PDN Connectivity Request message shown in FIG. 14, the UE 110 includes the CSG-ID in the PDN Connectivity Request message. Further, the MME 170 includes this CSG-ID in the Create Session Request message to be transmitted to the S-GW 171.

The S-GW 171 transfers the Create Session Request message received from the MME 170 to the HeNB-GW 160.

The HeNB-GW 160 selects the appropriate L-GW (HNB) by using the APN included in the Create Session Request message as in the case shown in FIG. 14. Meanwhile, when a CSG-ID stored in association with this APN coincides with the CSG-ID included in the Create Session Request message (in other words, when the UE 110 is allowed to access the selected L-GW (HeNB)), the HeNB-GW 160 transfers the Create Session Request message to the selected L-GW (HeNB). On the other hand, when both CSG-IDs do not coincide with each other (in other words, when the UE 110 is not allowed to access the selected L-GW (HeNB)), the HeNB-GW 160 does not transfer the Create Session Request message.

Thus, in this exemplary embodiment, it is possible to achieve the effect that the remote IP access can be performed only for an allowable UE which is allowed to access the HeNB.

Note that it is not essential to notify the CSG-ID from the HeNB to the HeNB-GW. The CSG-ID may be preliminarily stored in the database as with the above-mentioned sixth exemplary embodiment. In this case, the above-mentioned effect can be similarly achieved. In addition, it is also possible to achieve the effect that it is not necessary to modify the existing S1 establishment procedure and that the amount of traffic between the HeNB and the HeNB-GW can be reduced.

[Eighth Exemplary Embodiment]

A communication system, an HeNB-GW, an HeNB and an S-GW according to this exemplary embodiment can be configured as with the above-mentioned fifth exemplary embodiment. Meanwhile, this exemplary embodiment is different from the above-mentioned fifth exemplary embodiment, in that the controller in the HeNB-GW further stores function information indicating whether or not each HeNB has the LIPA function, and transfers the Create Session Request message only to the HeNB whose corresponding function information indicates "presence of LIPA function".

According to this exemplary embodiment, even under circumstances where an HeNB which has the LIPA function and an HeNB which does not have the LIPA function are mixed, it is possible to achieve the effect that the HeNB-GW can appropriately select the HeNB having the LIPA function upon the remote IP access.

Note that the function information may be notified from the HeNB to the HeNB-GW in the S1 establishment procedure, or may be preliminarily set in the database. In both cases, the above-mentioned effect can be similarly achieved. In the latter case, it is also possible to achieve the effect that it is not necessary to modify the existing S1 establishment procedure and that the amount of traffic between the HeNB and the HeNB-GW can be reduced.

It should be noted that the present inventive concept is not limited to the above exemplary embodiments but modification can be made as needed without deviating from the spirit and scope as defined by the claims.

The whole or part of the exemplary embodiments disclosed above can be described as, but not limited to, the following supplementary notes.

(Supplementary Note 1)

A gateway that establishes a secure tunnel between the gateway and each of a plurality of base stations through a public network, the gateway comprising: a first communicator that communicates with each of the base stations through the secure tunnel;

a second communicator that communicates with a core network; and a controller that controls the first and second communicators to relay traffic between the core network and each of the base stations, wherein the controller is configured to:

store an APN (Access Point Name) supported by each of the base stations, when each of the base stations includes a function of routing traffic received through the secure tunnel into a local network to which each of the base stations belongs; and transfer, when receiving from the core network a first message for establishing a communication path to any one of the plurality of base stations from a mobile station attaching to a RAN (Radio Access Network) connected to the core network, the first message to a base station corresponding to a first APN included in the first message.

(Supplementary Note 2)

The gateway according to Supplementary note 1, wherein the controller is configured to preliminarily store the APN supported by each of the base stations prior to starting communication with each of the base stations.

(Supplementary Note 3)

The gateway according to Supplementary note 1, wherein the first communicator is configured to receive, upon starting communication with each of the base stations, from each of the base stations a second message including the APN supported by each of the base stations, and wherein the controller is configured to store the APN included in the second message.

(Supplementary Note 4)

The gateway according to any one of Supplementary notes 1 to 3, wherein the controller is configured to:

hold, in a database, information on a mobile station that can connect to each of the base stations;

refer to the database to determine whether or not a mobile station corresponding to the first message can connect to the base station corresponding to the first APN; and transfer the first message to the base station corresponding to the first APN, only when it is determined that the mobile station can connect to the base station corresponding to the first APN.

(Supplementary Note 5)

The gateway according to Supplementary note 4, wherein the database is preliminarily created prior to starting communication with each of the base stations.

(Supplementary Note 6)

The gateway according to any one of Supplementary notes 1 to 5, wherein the controller is configured to:

select one base station when there are a plurality of base stations that correspond to the first APN; and transfer the first message to the selected base station.

(Supplementary Note 7)

A base station that is incorporated into a core network through a public network, the base station comprising:

a communicator that establishes a secure tunnel between the base station and a gateway through the public network to communicate with the gateway;

a router that routes traffic received through the secure tunnel into a local network to which the base station belongs; and a controller that controls the communicator and the router, wherein the communicator is configured to receive, from the gateway, a first message for establishing a communication path to the base station from a mobile station attaching to a RAN connected to the core network, and wherein the controller is configured to cause, when the first message is received, the router to route traffic originated from the mobile station into the local network.

(Supplementary Note 8)

A communication node that is installed in a core network, the communication node comprising:

a first communicator that communicates with a gateway establishing a secure tunnel between the gateway and each of a plurality of base stations through a public network;

a second communicator that communicates, through a RAN connected to the core network, with a mobile station attaching to the RAN; and a controller that controls the first and second communicators, wherein the second communicator is configured to receive, from the mobile station, a first message for requesting access to one base station among the plurality of base stations, and wherein the controller is configured to:

generate a second message for establishing a communication path from the mobile station to the one base station, and set in the second message an APN included in the first message; and transmit the second message to the gateway.

(Supplementary Note 9)

The communication node according to Supplementary note 8, wherein the first communicator is configured to communicate with a plurality of gateways, and wherein the controller is configured to derive, by using the APN, an IP address of one gateway to be a transmission destination of the second message.
(Supplementary Note 10)
The communication node according to Supplementary note 8 or 9,
wherein the first message further includes information for causing the gateway to determine whether or not the mobile station can connect to the one base station, and
wherein the controller is configured to further set the information in the second message.
(Supplementary Note 11)
A communication system comprising:
a communication node that is installed in a core network; and
a gateway that establishes a secure tunnel between the gateway and each of a plurality of base stations through a public network,
wherein the communication node is configured to:
receive, through a RAN connected to the core network, from a mobile station attaching to the RAN, a first message for requesting access to one base station among the plurality of base stations;
generate a second message for establishing a communication path from the mobile station to the one base station, and set in the second message an APN included in the first message; and
transmit the second message to the gateway, and
wherein the gateway is configured to:
store an APN supported by each of the base stations, when each of the base stations includes a function of routing traffic received through the secure tunnel into a local network to which each of the base stations belongs; and
transfer, when the second message is received from the communication node, the second message to a base station corresponding to a first APN included in the second message.
(Supplementary Note 12)
The communication system according to Supplementary note 11,
wherein the mobile station is configured to further include, in the first message, information for causing the gateway to determine whether or not the mobile station can connect to the one base station,
wherein the communication node is configured to further set the information in the second message, and
wherein the gateway is configured to:
hold, in a database, information on a mobile station that can connect to each of the base stations;
refer to the database to determine whether or not the mobile station can connect to the base station corresponding to the first APN; and
transfer the second message to the base station corresponding to the first APN, only when it is determined that the mobile station can connect to the base station corresponding to the first APN.
(Supplementary Note 13)
The communication system according to Supplementary note 12, wherein the database is preliminarily created prior to starting communication with each of the base stations.
(Supplementary Note 14)
The communication system according to any one of Supplementary notes 11 to 13, wherein the gateway is configured to preliminarily store the APN supported by each of the base stations prior to starting communication with each of the base stations.
(Supplementary Note 15)
The communication system according to any one of Supplementary notes 11 to 13,
wherein each of the base stations is configured to transmit, upon starting communication with the gateway, to the gateway a third message including the APN supported by each of the base stations, and
wherein the gateway is configured to store the APN included in the third message.
(Supplementary Note 16)
A method of controlling a gateway that establishes a secure tunnel between the gateway and each of a plurality of base stations through a public network, the method comprising:
storing an APN supported by each of the base stations, when each of the base stations includes a function of routing traffic received through the secure tunnel into a local network to which each of the base stations belongs; and
transferring, when receiving from the core network a first message for establishing a communication path to any one of the plurality of base stations from a mobile station attaching to a RAN connected to the core network, the first message to a base station corresponding to a first APN included in the first message.
(Supplementary Note 17)
A method of controlling a base station that is incorporated into a core network through a public network, the method comprising:
establishing a secure tunnel between the base station and a gateway through the public network to communicate with the gateway;
receiving, from the gateway, a first message for establishing a communication path to the base station from a mobile station attaching to a RAN connected to the core network; and
routing, when the first message is received, traffic received from the mobile station through the secure tunnel into a local network to which the radio base station belongs.
(Supplementary Note 18)
A method of controlling a communication node that is installed in a core network, the method comprising:
receiving, through a RAN connected to the core network, from a mobile station attaching to the RAN, a first message for requesting access to one base station among a plurality of base stations that are incorporated into the core network through a public network;
generating a second message for establishing a communication path from the mobile station to the one base station, and setting in the second message an APN included in the first message; and
transmitting the second message to a gateway that establishes a secure tunnel between the gateway and each of the base stations through the public network.

What is claimed is:

1. A gateway connected to a plurality of base stations and a core network, the gateway comprising:
   a receiver adapted to receive, from the core network, a message establishing a communication path to any one of the plurality of base stations, wherein the message includes a received Access Point Name (APN);
   a controller adapted to determine, in response to the APN included in the message, a destination of the message using information indicating a destination base station corresponding to the received APN;
   a transmitter adapted to transmit the message with the destination base station as the destination of the transmission; and
   a database that stores information indicating one or more mobile stations permitted to connect to the destination base station, wherein:
  the message includes an indicator of a requesting mobile station;
  the controller responds to the message by using the database to determine whether the indicated requesting mobile station is one of the permitted mobile stations; and
  when the indicated requesting mobile station is one of the permitted mobile stations, the transmitter transmits the message with the destination base station as the destination of the transmission.

2. The gateway according to claim 1, further comprising a memory adapted to store:
  the APN as a stored APN; and
  information including an indication of the destination base station corresponding to the stored APN.

3. The gateway according to claim 2, wherein the memory stores the stored APN before the gateway starts sending communication messages, for a mobile station, using the indicated destination base station information.

4. A mobile communication system comprising:
  a plurality of base stations;
  a core network; and
  a gateway configured to communicate with the plurality of base stations and the core network, and comprising:
    a receiver adapted to receive, from the core network, a message establishing a communication path to any one of the plurality of base stations, wherein the message includes a received Access Point Name (APN);
    a controller adapted to determine, in response to the APN included in the massage, a destination of the message using information indicating a destination base station corresponding to the received APN;
    a transmitter adapted to transmit the message with the destination base station as the destination of the transmission; and
    a database that stores information indicating one or more mobile stations permitted to connect to the destination base station,
  wherein:
    the message includes an indicator of a requesting mobile station;
    the controller responds to the message by using the database to determine whether the indicated requesting mobile station is one of the permitted mobile stations; and
    when the indicated requesting mobile station is one of the permitted mobile stations, the transmitter transmits the message with the destination base station as the destination of the transmission.

5. A method of controlling a gateway connected to a plurality of base stations and a core network, the method comprising:
  receiving, from the core network, a message establishing a communication path to any one of the plurality of base stations, wherein the message includes a received Access Point Name (APN);
  determining, in response to the APN included in the massage, a destination of the message using information indicating a destination base station corresponding to the received APN;
  transmitting the message with the destination base station as the destination of the transmission; and
  storing, in a database, information indicating one or more mobile stations permitted to connect to the destination base station,
  wherein:
    the message includes an indicator of a requesting mobile station;
    the determination is performed in response to the message by using the database to determine whether the indicated requesting mobile station is one of the permitted mobile stations; and
    when the indicated requesting mobile station is one of the permitted mobile stations, the transmission is performed to transmit the message with the destination base station as the destination of the transmission.

6. A non-transitory computer readable medium including instructions for controlling a processor to implement a method for a gateway connected to a plurality of base stations and a core network, the method comprising:
  receiving, from the core network, a message establishing a communication path to any one of the plurality of base stations, wherein the message includes a received Access Point Name (APN);
  determining, in response to the APN included in the massage, a destination of the message using information indicating a destination base station corresponding to the received APN;
  transmitting the message with the destination base station as the destination of the transmission; and
  storing, in a database, information indicating one or more mobile stations permitted to connect to the destination base station,
  wherein:
    the message includes an indicator of a requesting mobile station;
    the determination is performed in response to the message by using the database to determine whether the indicated requesting mobile station is one of the permitted mobile stations; and
    when the indicated requesting mobile station is one of the permitted mobile stations, the transmission is performed to transmit the message with the destination base station as the destination of the transmission.

* * * * *